(12) United States Patent
Okuno et al.

(10) Patent No.: US 7,346,231 B2
(45) Date of Patent: *Mar. 18, 2008

(54) IMAGE PROCESSING DEVICE INCLUDING PIXEL INTERPOLATION

(75) Inventors: Yoshiaki Okuno, Tokyo (JP); Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 739 days.

This patent is subject to a terminal disclaimer.

(21) Appl. No.: 10/422,906

(22) Filed: Apr. 25, 2003

(65) Prior Publication Data

US 2003/0215159 A1   Nov. 20, 2003

(30) Foreign Application Priority Data

Apr. 26, 2002  (JP) .............................. 2002-126155

(51) Int. Cl.
   *G06K 9/32*   (2006.01)
(52) U.S. Cl. ...................................... 382/300; 382/270
(58) Field of Classification Search ................ 358/428, 358/525; 382/270, 276, 299, 300; 348/65, 348/448
   See application file for complete search history.

(56) References Cited

U.S. PATENT DOCUMENTS

| | | | | |
|---|---|---|---|---|
| 5,568,597 A * | 10/1996 | Nakayama et al. | ......... | 345/606 |
| 5,742,348 A * | 4/1998 | Kuwahara et al. | .......... | 348/441 |
| 5,754,710 A * | 5/1998 | Sekine et al. | ................ | 382/300 |
| 5,920,654 A | 7/1999 | Someya et al. | | |
| 5,978,554 A * | 11/1999 | Hakamada et al. | .......... | 358/1.9 |
| 6,021,230 A * | 2/2000 | Cho et al. | ................... | 382/300 |
| 6,288,745 B1 | 9/2001 | Okuno et al. | | |
| 6,577,774 B1 * | 6/2003 | Asada | ......................... | 382/264 |
| 6,639,691 B2 * | 10/2003 | Acharya | ..................... | 358/1.9 |
| 6,943,821 B2 * | 9/2005 | Abe et al. | ..................... | 348/65 |
| 6,985,187 B2 * | 1/2006 | Han et al. | ................... | 348/452 |
| 7,039,254 B1 * | 5/2006 | Maenaka et al. | ........... | 382/300 |
| 2002/0140807 A1 * | 10/2002 | Abe et al. | ..................... | 348/65 |
| 2003/0031366 A1 * | 2/2003 | Li et al. | ...................... | 382/206 |
| 2003/0179935 A1 * | 9/2003 | Kubota | ........................ | 382/199 |
| 2003/0215159 A1 * | 11/2003 | Okuno et al. | ............... | 382/300 |

FOREIGN PATENT DOCUMENTS

| | | | |
|---|---|---|---|
| EP | 1517536 A1 | * | 3/2005 |
| JP | 5-68240 A | | 3/1993 |
| JP | 10-155128 | | 6/1998 |
| JP | 11-069144 A | | 3/1999 |
| JP | 2002-064704 | | 2/2002 |

* cited by examiner

*Primary Examiner*—Gregory M Desire
(74) *Attorney, Agent, or Firm*—Birch, Stewart, Kolasch & Birch, LLP

(57) ABSTRACT

The present invention relates to an image processing device including pixel interpolation, such as a pixel interpolation device, a line interpolation device, an image size conversion device and an image interpolation device.

The pixel interpolation device according to the present invention includes an interpolation pattern table, which outputs an interpolation direction data designating interpolation directions including directions joining intermediate points of pixels. The interpolation pixel data is calculated based on the pixel data located in the interpolation direction designated by the interpolation direction data. The image interpolation device, the pixel number conversion device and the line interpolation device according to the present invention includes the pixel interpolation device described above.

19 Claims, 46 Drawing Sheets

Binarized Pixel Pattern 1

○ : 1
● : 0

Interpolation Direction 1

Binarized Pixel Pattern 2

○ : 1
● : 0

Interpolation Direction 2

Binarized Pixel Pattern 3

Interpolation Direction 3

Binarized Pixel Pattern 4

Interpolation Direction 4

Binarized Pixel Pattern 6

Interpolation Direction 6

Interpolation Direction 7

○:1  ●:0

Binarized Pixel Pattern 7

Binarized Pixel Pattern 8

Interpolation Direction 8

Binarized Pixel Pattern 9

○ : 1
● : 0

Interpolation Direction 9

Interpolation Direction 10

Binarized Pixel Pattern 10

Binarized Pixel Pattern 11

Interpolation Direction 11

Binarized Pixel Pattern 12

Interpolation Direction 12

Interpolation Direction 13

○:1  ●:0

Binarized Pixel Pattern 13

Binarized Pixel Pattern 14

Interpolation Direction 14

Binarized Pixel Pattern 15

○ : 1
● : 0

Interpolation Direction 15

Binarized Pixel Pattern 16

○ : 1
● : 0

Interpolation Direction 16

Binarized Pixel Pattern 17

Interpolation Direction 17

Interpolation Direction 5

Binarized Pixel Pattern 10

Binarized Pixel Pattern 11

○ : 1
● : 0

Interpolation Direction 3

Binarized Pixel Pattern 12

Binarized Pixel Pattern 13

○:1
●:0

Interpolation Direction 7

Interpolation Direction 2

Binarized Pixel Pattern 14

Binarized Pixel Pattern 15

○:1
●:0

Interpolation Direction 8

Binarized Pixel Pattern 16

Binarized Pixel Pattern 17

○:1
●:0

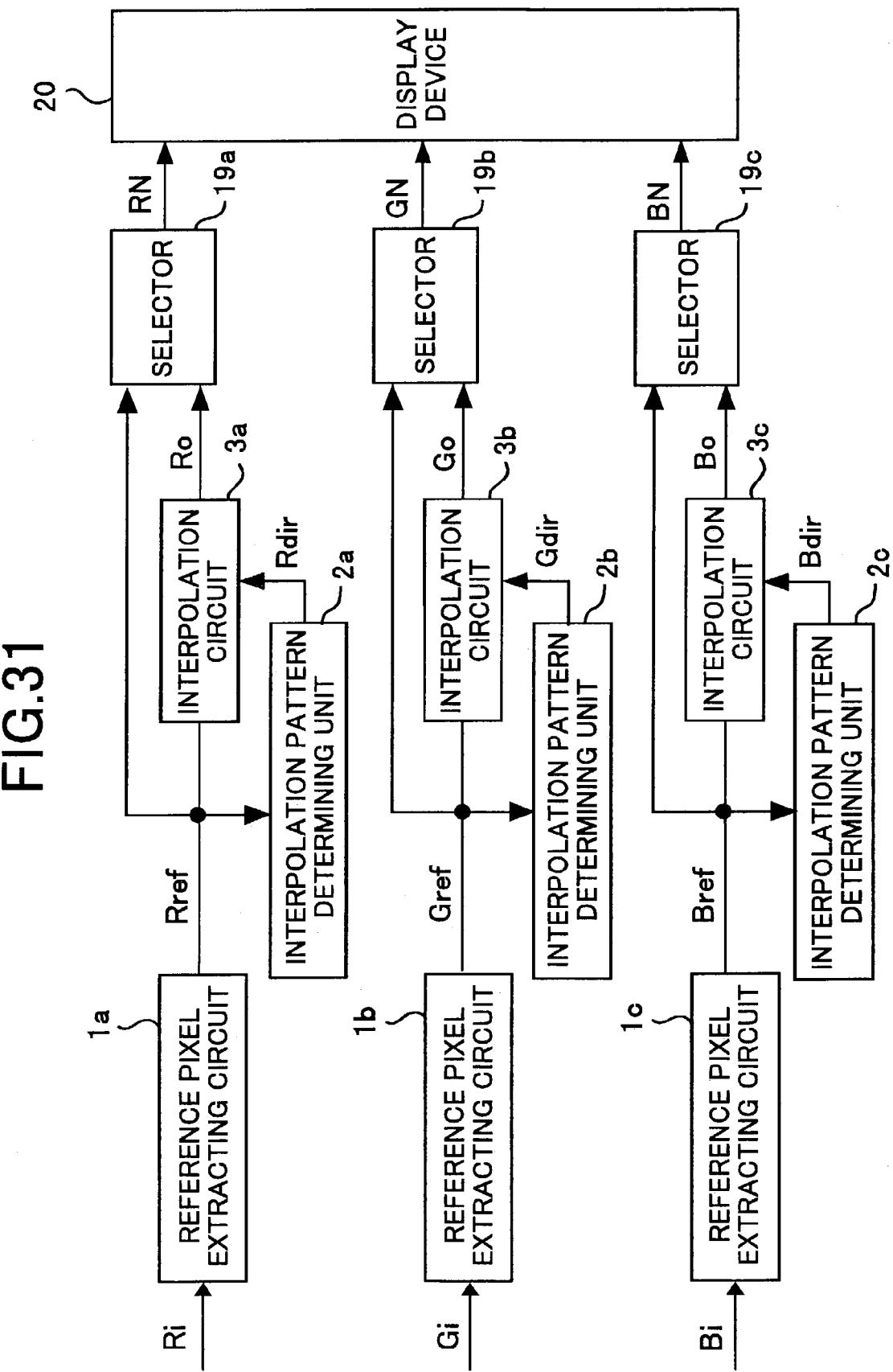

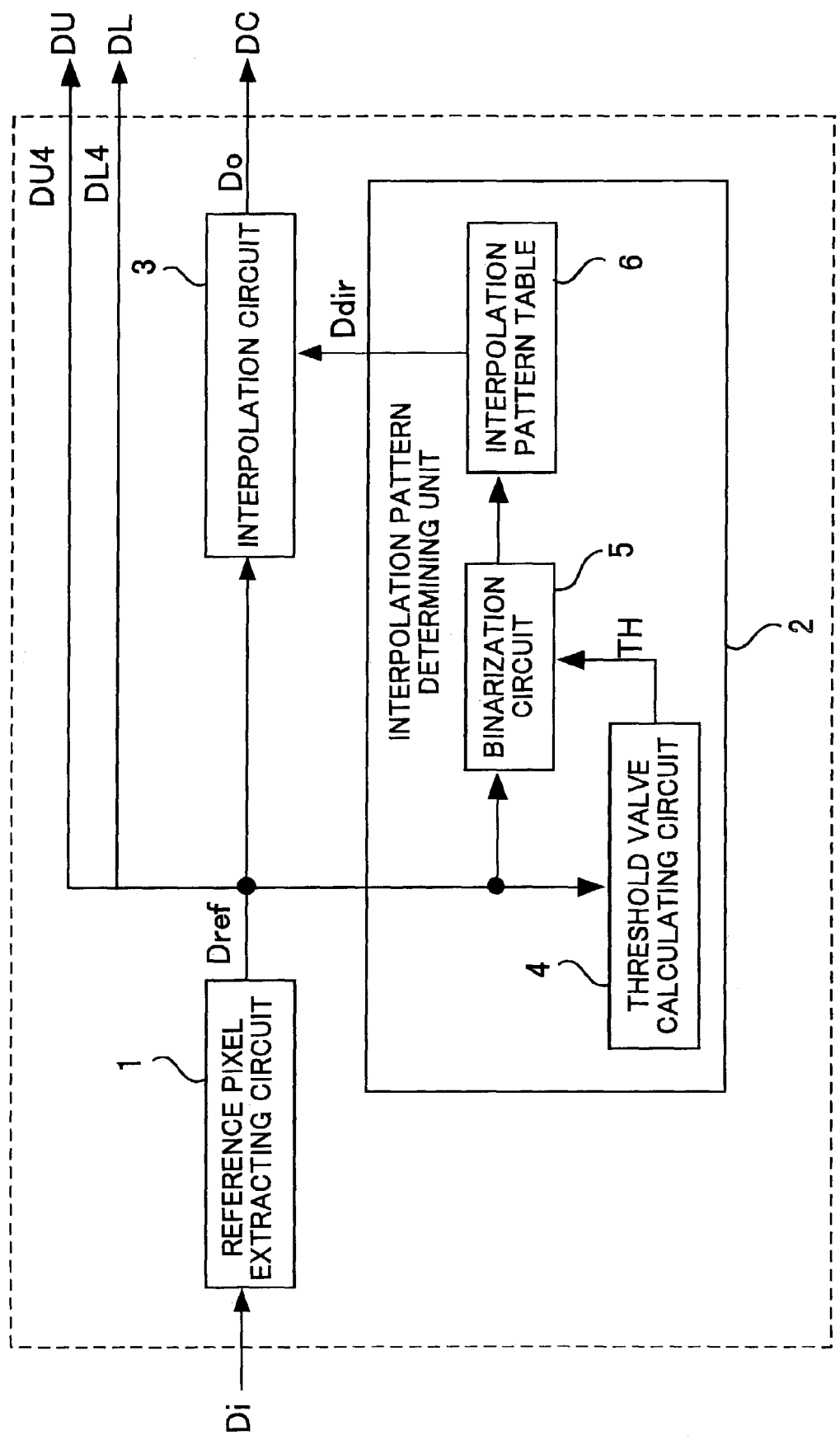

Ri, Gi, Bi

RZ, GZ, BZ

Defected Image

Interpolated Image

○ : Reference Pixel Data Dref

■ : Interpolation Pixel Data Do

IMAGE PROCESSING DEVICE INCLUDING PIXEL INTERPOLATION

BACKGROUND OF THE INVENTION

1. Field of the Invention

The present invention relates to an image processing device including pixel interpolation, such as a pixel interpolation device, a line interpolation device, an image size conversion device and an image interpolation device.

2. Related Art

FIG. 49 is a diagram showing a structure of a pixel interpolation device described in Japanese Patent Laid Open No. H5-68240. A delay circuit 101 extracts pixel data a, b, c, d, e and f, which forming an area of 3×2 dots shown in FIG. 50 from an input pixel data Pin. In FIG. 50, each open circle "○" represents the pixel data, and each cross "X" represents an interpolation pixel data. In FIG. 50, the interpolation pixel designated by Po is calculated based on a pixel data a, b, d, d, e and f.

A threshold value calculating circuit 103 calculates an average value of the pixel data a, b, c, d, e and f and outputs the calculated average value as a threshold value data SH. The threshold value data SH is sent to a binarization circuit 104. The binarization circuit 104 compares each value of the pixel data a, b, c, d, e and f with the threshold value data SH, thereby producing binarization pixel data l, m, n, x, y and z. If the pixel data is not less than the threshold value data SH, the binarization circuit 104 outputs "1" as the binarization pixel data. Conversely, if the pixel data is less than the threshold value data SH, the binarization circuit 104 outputs "0" as the binarization pixel data. The binarized pixel data l, m, n, x, y and z correspond to the pixel data a, b, c, d, e and f, respectively. The binarized pixel data l, m, n, x, y and z are sent to an interpolation pattern table 105.

The interpolation pattern table 105 outputs an interpolation direction data IS designating one of three interpolation directions, a vertical interpolation, a right slant interpolation and a left slant interpolation. FIG. 51 is a schematic diagram showing the interpolation directions corresponding to the binarized pixel data l, m, n, x, y and z. In FIG. 51, each open circle "○" represents the binarized pixel data "1", and each solid circle "●" represents the binarized pixel data "0", and the interpolation directions are indicated by a vertical line "|" designating vertical interpolation, a slash "/" designating left slant interpolation and back slash "\" designating right slant interpolation. For example, if the binarized pixel data x, y and z are "0", "0" and "0" (pattern u0), and l, m and n are "1", "1" and "0" (pattern d6), the interpolation direction data IS designates the right slant interpolation "\".

As shown in FIG. 49, the interpolation direction data IS is sent to a selector 107. The selector 107 selects two pixel data PU and PD, which are located in the interpolation direction, from the pixel data a, b, c, d, e and f. The pixel data PU and PD are sent to an adder 108.

The adder 108 adds the pixel data PU and PD, and the sum of the pixel data PU and PD are sent to a divider 109. The divider 109 divides the sum, thereby producing the interpolation pixel data Po.

FIG. 52 is a diagram showing relations between the interpolation directions and the pixel data PU and PD which are used to calculate the interpolation pixel data Po. If the interpolation direction data IS designates the vertical interpolation, the interpolation pixel data Po is calculated by averaging the pixel data b and e. If the interpolation direction data IS designates the right slant interpolation, the interpolation pixel data Po is calculated by averaging the pixel data d and c. If the interpolation direction data IS designates the left slant interpolation, the interpolation pixel data Po is calculated by averaging the pixel data a and f.

The pixel interpolation device described above has only three interpolation directions. Consequently, a loss of high frequency components occurs in the pixel interpolation process.

SUMMARY OF THE INVENTION

It is therefore an object of the present invention to provide an image processing device including pixel interpolation, which is capable of producing interpolation pixel data without losing the high frequency components.

The pixel interpolation device according to the present invention includes a reference pixel extracting circuit which extracts reference pixel data used to produce an interpolation pixel data, a binarization circuit, and an interpolation pattern table. The binarization circuit produce a binarized pixel data by binarizing the reference pixel data, and the interpolation pattern table outputs an interpolation direction data designating interpolation directions based on the binarized pixel data. The interpolation direction data designates an interpolation directions including directions joining intermediate points of pixels. The interpolation pixel data is calculated based on the pixel data selected from the reference pixel data according to the interpolation direction designated by the interpolation direction data.

The image interpolation device, the pixel number conversion device and the line interpolation device according to the present invention includes the pixel interpolation device described above.

BRIEF DESCRIPTION OF THE DRAWINGS

FIGS. 31, 33 to 36, and 38 are block diagrams showing structures of line interpolation devices according to the second to sixth embodiments.

FIG. 41 is a block diagram showing a structure of a pixel interpolation device according to the seventh embodiment.

DESCRIPTION OF THE EMBODIMENTS

First Embodiment

Figure 1:
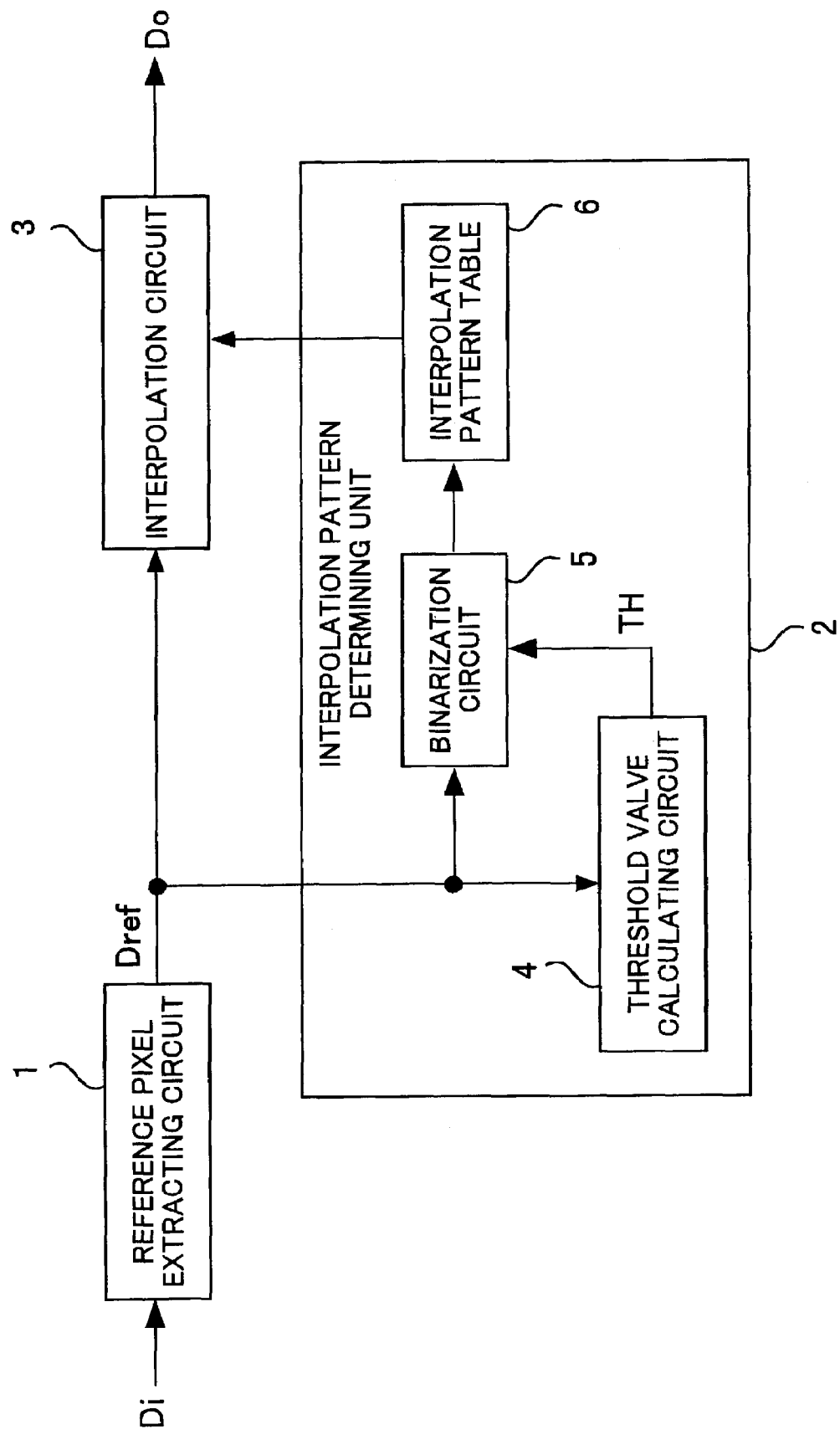
FIG. 1 is a block diagram showing a structure of a pixel interpolation device according to the First Embodiment.

FIG. 1 is a block diagram showing a structure of a pixel interpolation device according to the first embodiment. As shown in FIG. 1, the pixel interpolation device according to the first embodiment includes a reference pixel extracting circuit 1, an interpolation pattern determining unit 2 and an interpolation circuit 3. The interpolation pattern determining unit 2 includes a threshold value calculating circuit 4, a binarization circuit 5 and an interpolation pattern table 6.

The reference pixel extracting circuit 1 extracts a reference pixel data Dref, from quantized image data Di. The reference pixel data Dref is sent to the interpolation circuit 3, the threshold value calculating circuit 4 and the binarization circuit 5.

Figure 2:
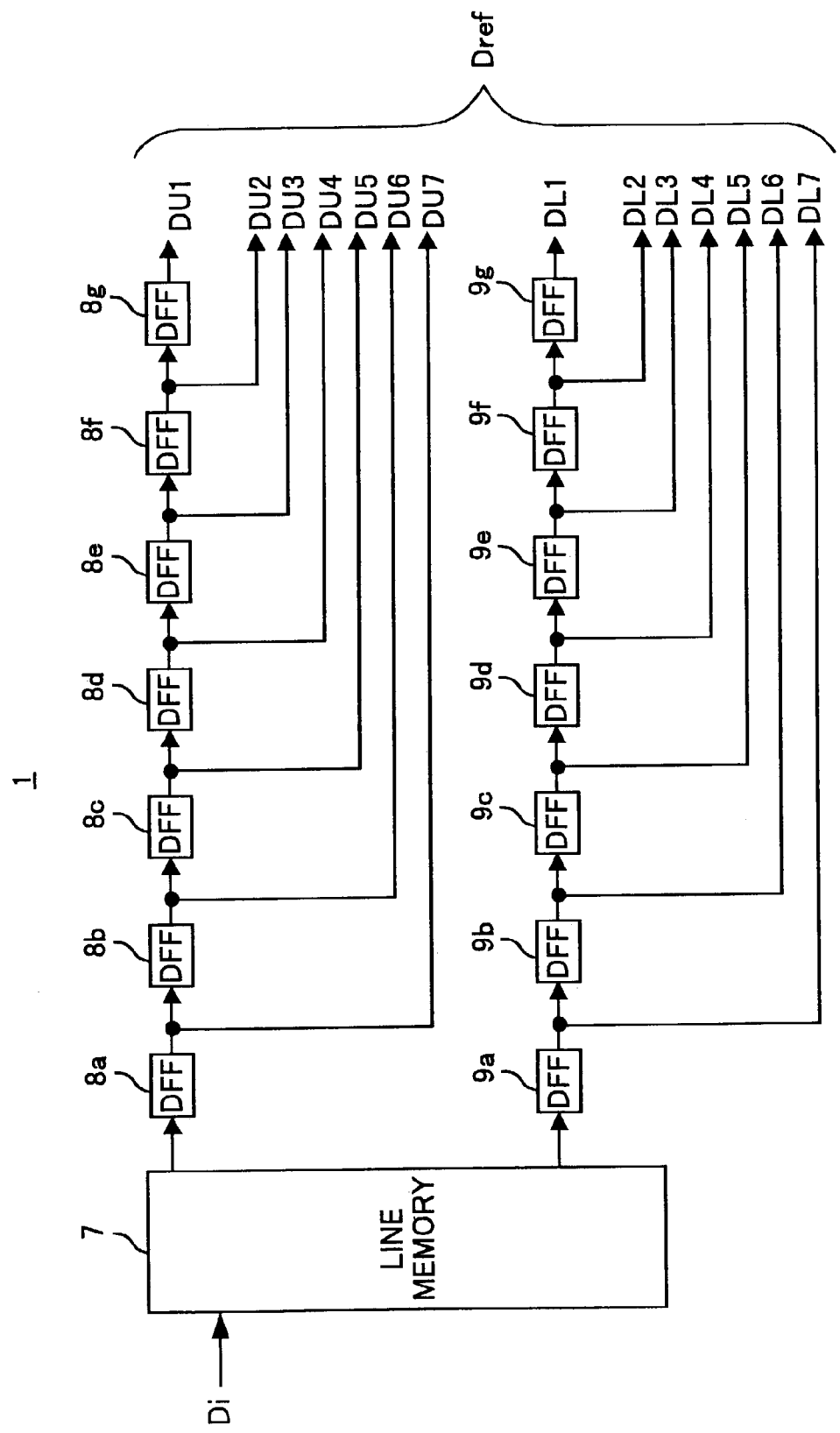
FIGS. 2, 4, 5, 24, 25 and 26 are block diagrams each showing various parts of the pixel interpolation device according to the first embodiment.

FIG. 2 is a block diagram showing a structure of the reference pixel extracting circuit 1. As shown in FIG. 2, the reference pixel extracting circuit 1 includes a line memory 7 and plurality of D-type flip-flops (DFFS) $8a$, $8b$, $8c$, $8d$, $8e$, $8f$, $8g$, $9a$, $9b$, $9c$, $9d$, $9e$, $9f$ and $9g$. The line memory 7 holds the pixel data, which compose adjacent two lines (herein after referred to as reference lines 1 and 2) included in the image data Di. The pixel data stored in the line memory 7 are sent to the DFFs $8a$ and $9a$. Each of the DFFs $8a$, $8b$, $8c$, $8d$, $8e$, $8f$, $8g$, $9a$, $9b$, $9c$, $9d$, $9e$, $9f$ and $9g$ delays the respective pixel data inputted thereto by one dot period.

Figure 3:
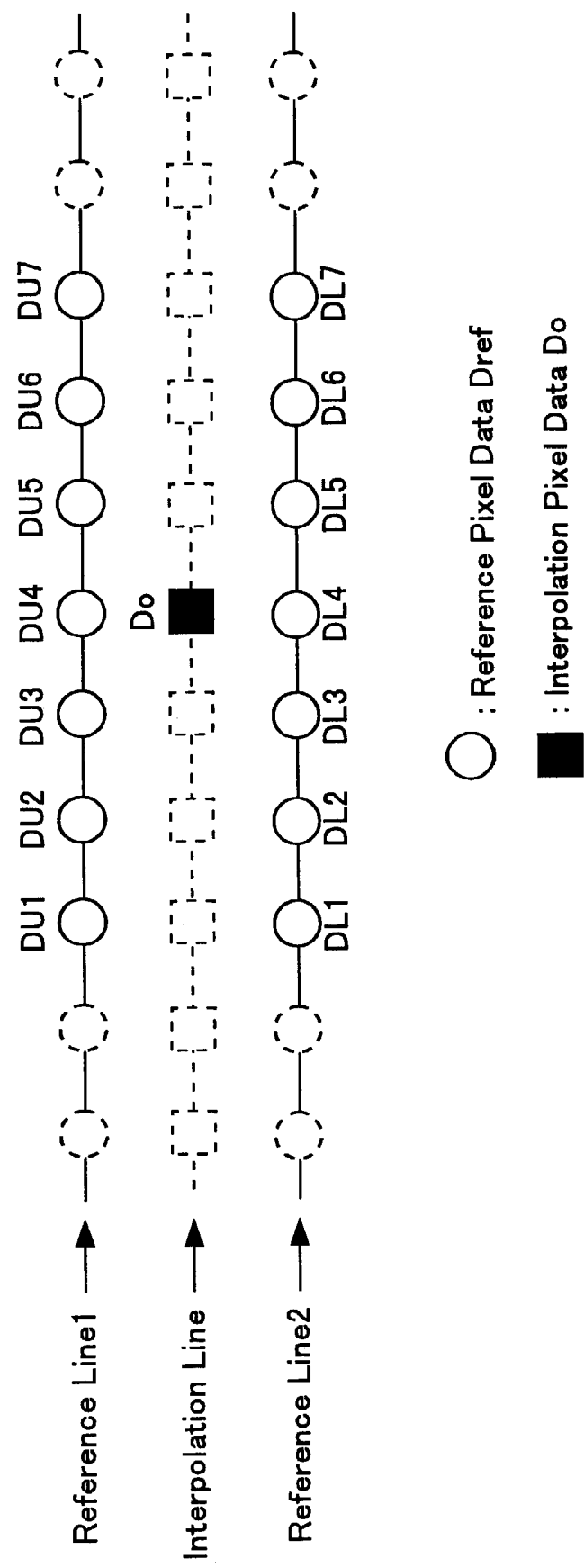
FIGS. 3, 37 and 48 are schematic diagrams each showing a reference pixel data and an interpolation data.

FIG. 3 is a schematic diagram showing the reference pixel data Dref and an interpolation pixel data Do. As shown in FIG. 3, the reference pixel data Dref consists of a plurality of pixel data DU1, DU2, DU3, DU4, DU5, DU6, DU7, DL1, DL2, DL3, DL4, DL5, DL6 and DU7 forming an area of 7×2 dots. The interpolation pixel data Do is calculated based on these pixel data DU1, DU2, DU3, DU4, DU5, DU6, DU7, DL1, DL2, DL3, DL4, DL51 DL6 and DL7. The DFFs $8a$, $8b$, $8c$, $8d$, $8e$, $8f$ and $8g$ output the pixel data DU7, DU6, DU5, DU4, DU3, DU2 and DU1 by delaying their respective inputs by one dot period. At the same time, the DFFs $9a$ $9a$, $9b$, $9c$, $9d$, $9e$, $9f$ and $9g$ output the pixel data DL7, DL6, DL5, DL4, DL3, DL2 and DL1 by delaying their respective inputs by one dot period.

Figure 4:
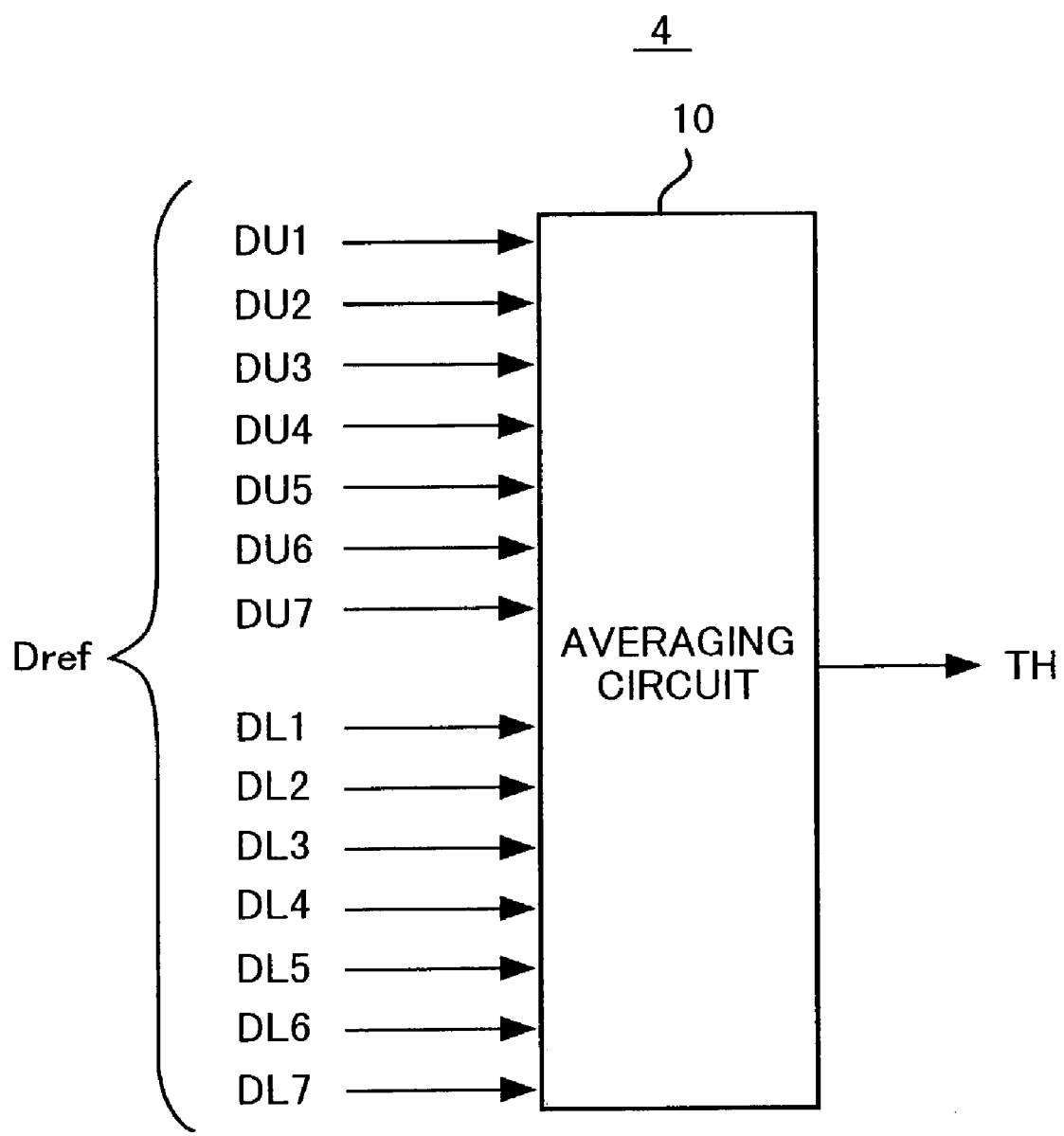

FIG. 4 is a block diagram showing a structure of the threshold value calculating circuit 4. An averaging circuit 10 calculates an average value of the reference pixel data Dref, and outputs it as the threshold value data TH. The threshold value data TH is sent to the binarization circuit 5.

Figure 5:
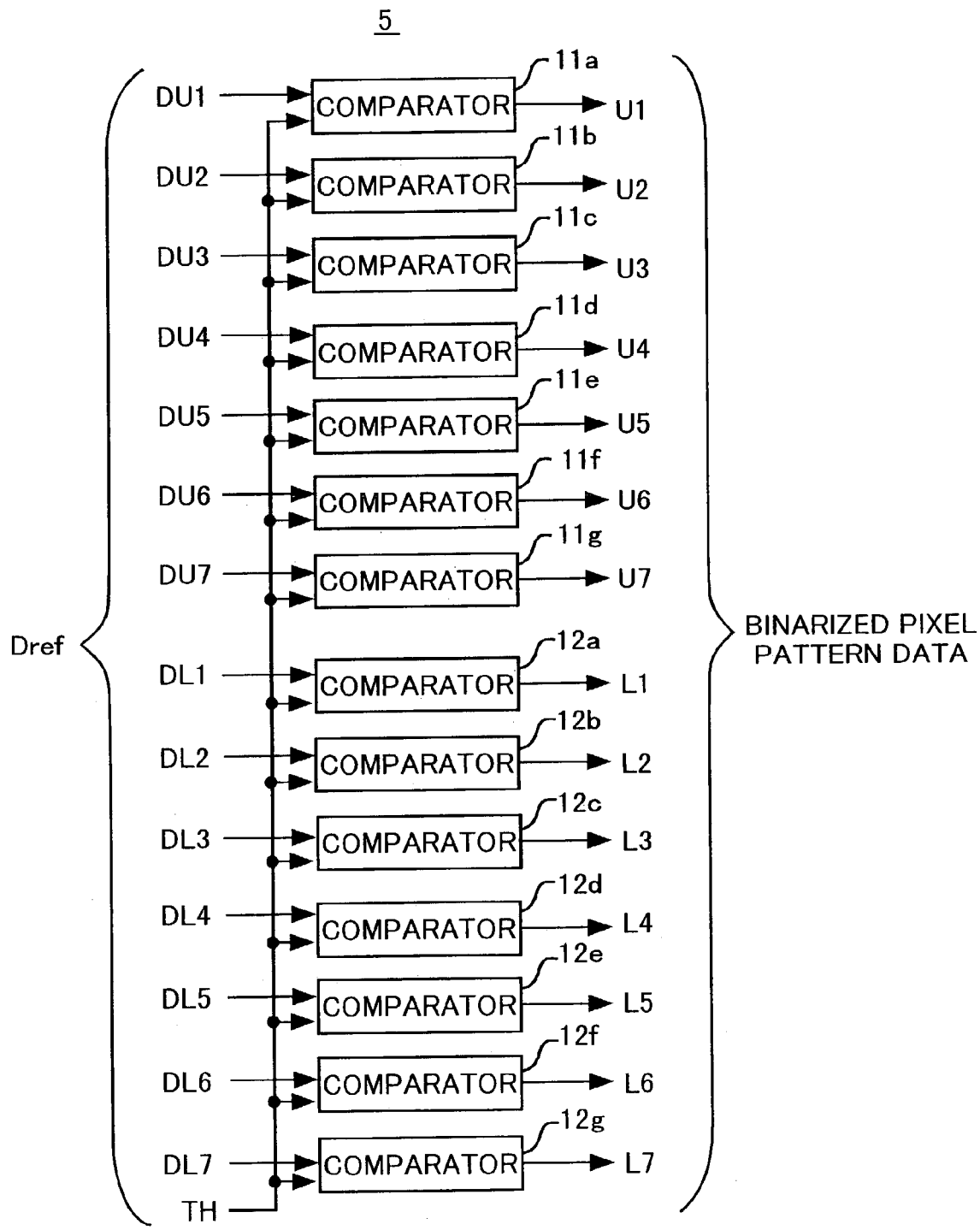

FIG. 5 is a block diagram showing a structure of the binarization circuit 5. The pixel data DU1, DU2, DU3, DU4, DU5, DU6, DU7, DL1, L2. DL3, DL4, DL5, DL6 and DL7 are sent to comparators $11a$, $11b$, $11c$, $11d$, $11e$, $11f$, $11g$, $12a$, $12b$, $12c$, $12d$, $12e$, $12f$ and $12g$ with the threshold value data TH. The comparators $11a$, $11b$, $11c$, $11d$, $11e$, $11f$, $11g$, $12a$, $12b$, $12c$, $12d$, $12e$, $12f$ and $12g$ produce binarized pixel data U1, U2, U3, U4, U5, U6, U7, L1, L2, L3, L4, L5, L6 and L7, by comparing the respective pixel data DU1, DU2, DU3, DU4, DU5, DU6, DU7, DL1, DL2, DL3, DL4, DL5, DL6 and DU7 with the threshold value data TH. If the pixel data is not less than the threshold value data TH, each of the comparators outputs "1" as the binarized pixel data. Conversely, if the pixel data is less than the threshold value data TH, each of the comparators outputs "0" as the binarized pixel data. The binarization circuit 5 outputs binarized pixel data U1, U2, U3, U4, U5, U6, U7, L1, L2, L3, L4, L5, L6 and L7 as binaraized pixel pattern data.

The binarized pixel pattern data, which is consists of the binarized pixel data U1, U2, U3, U4, U5, U6, U7, L1, L2, L3, L4, L5, L6 and L7, represents an outline image around the interpolation pixel Do. The binarized pixel pattern data is sent to the interpolation pattern table 6. The interpolation pattern table 6 outputs an interpolation direction data Ddir, which designates an interpolation direction, based on the binarized pixel pattern data.

Figure 6A:
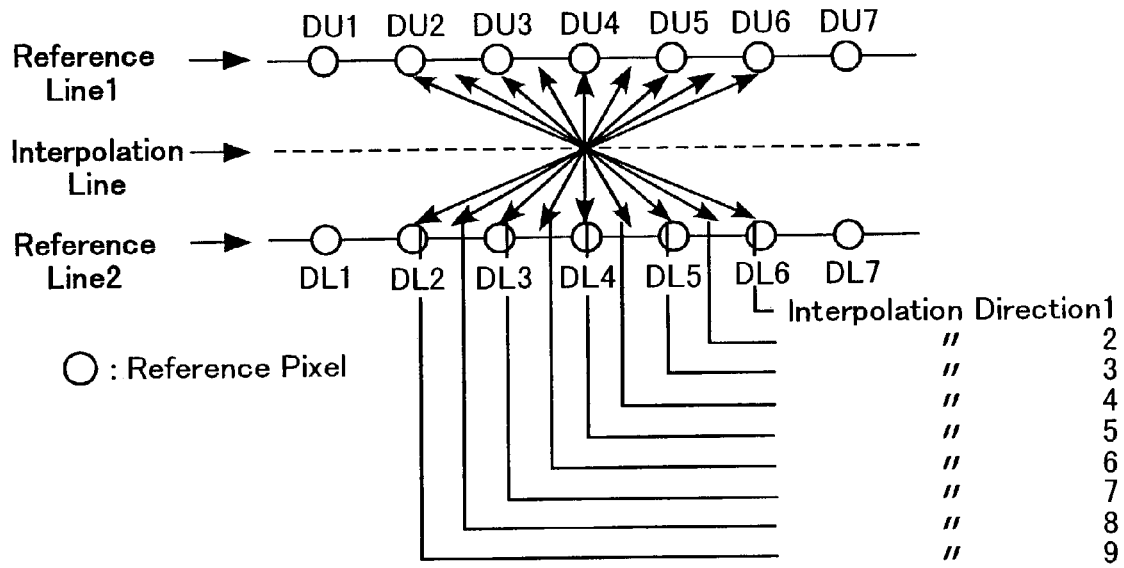
FIG. 6 is a diagram showing interpolation directions.
Figure 6B:
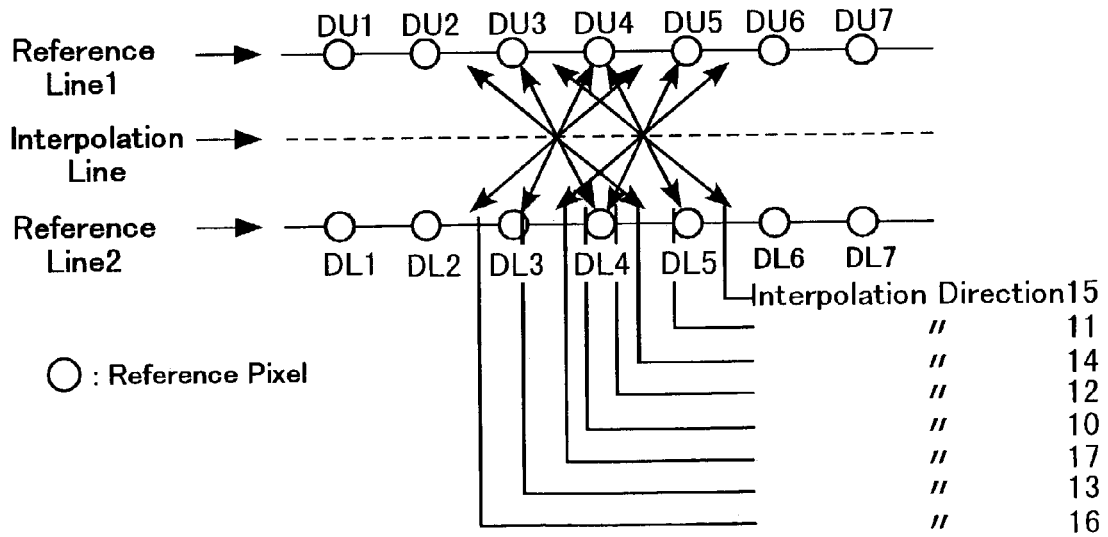
Figure 7B:
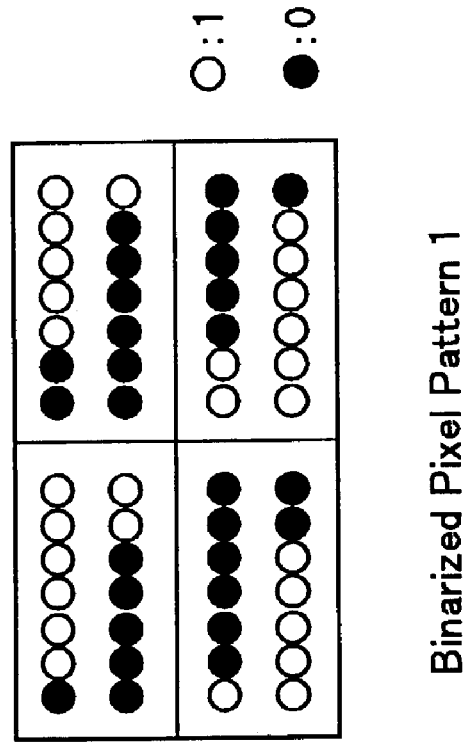
FIGS. 7 to 23, 27 to 30 are diagrams showing binarized pixel patterns and interpolating directions.
Figure 7A:
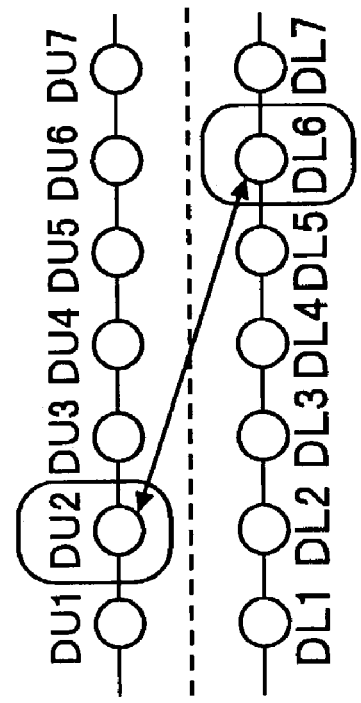
Figure 8B:
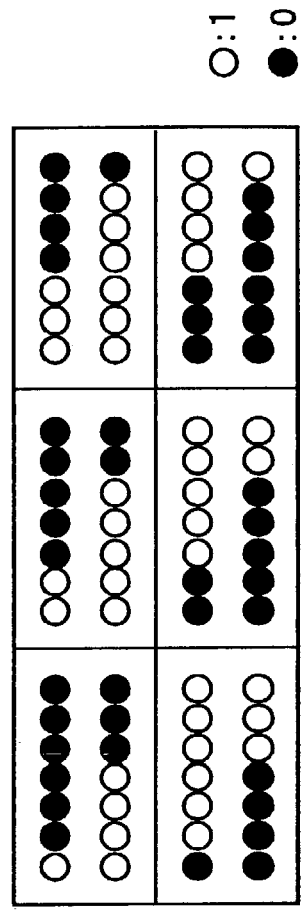
Figure 8A:
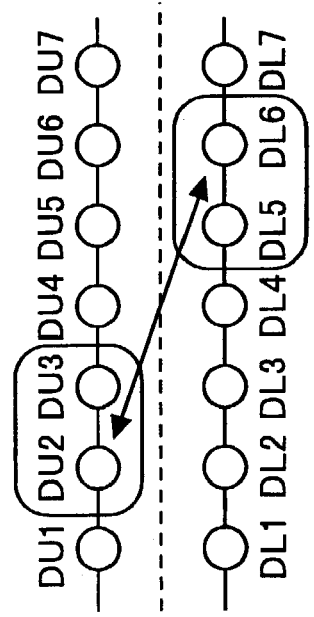
Figure 9B:
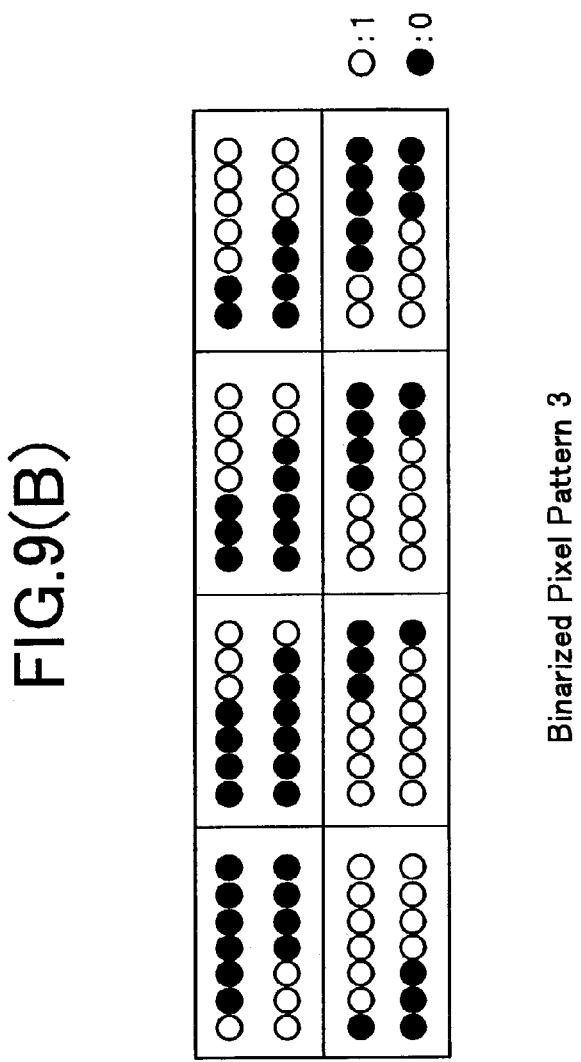
Figure 9A:
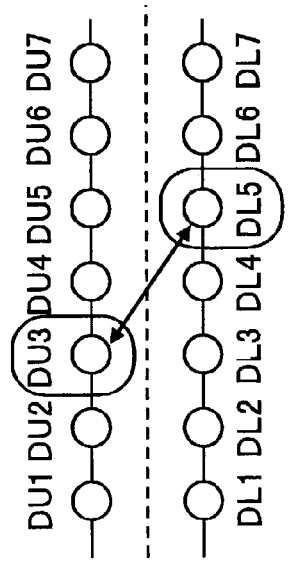
Figure 10B:
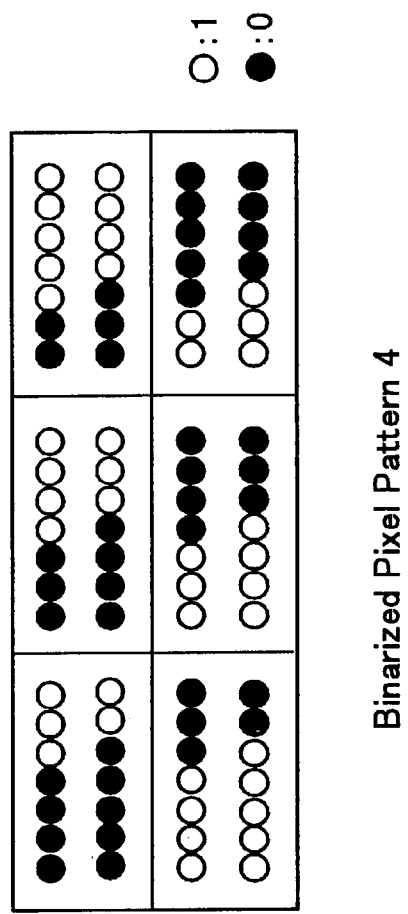
Figure 10A:
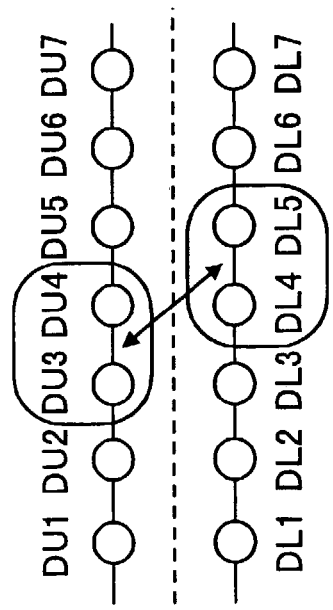
Figure 11B:
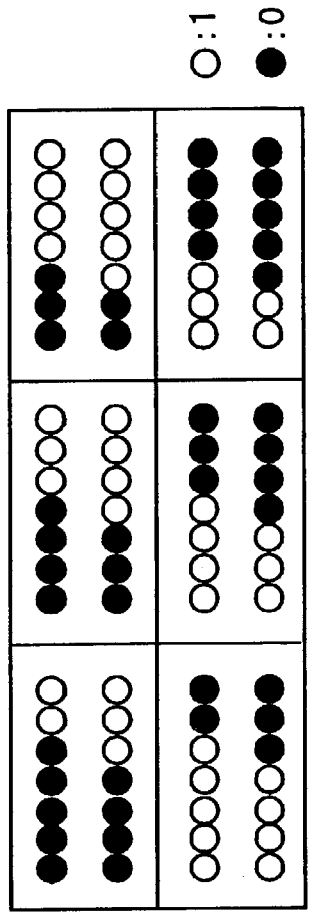
Figure 11A:
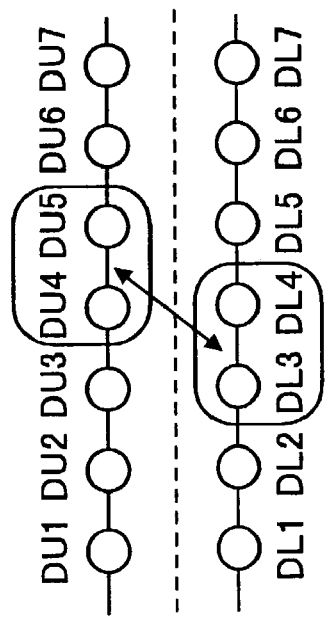
Figure 12A:
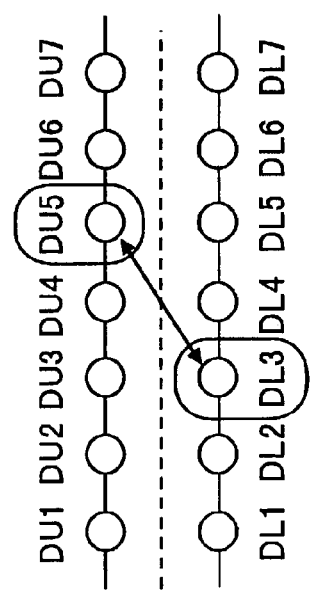
Figure 12B:
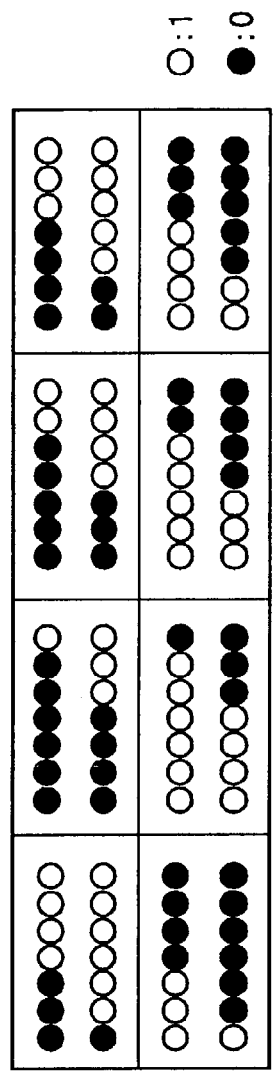
Figure 13B:
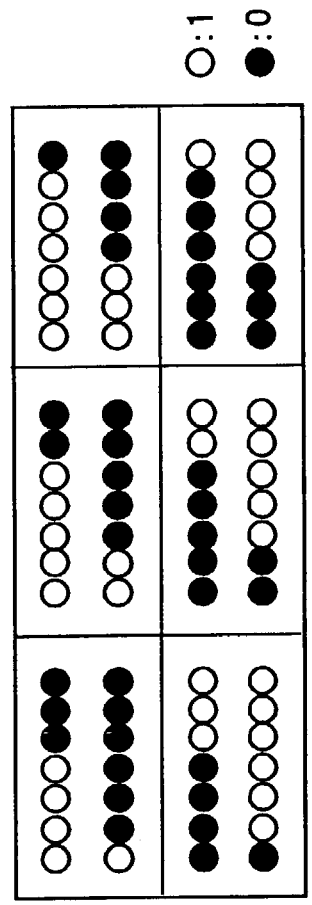
Figure 13A:
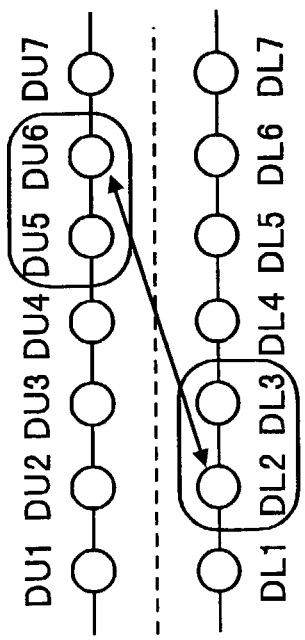
Figure 14B:
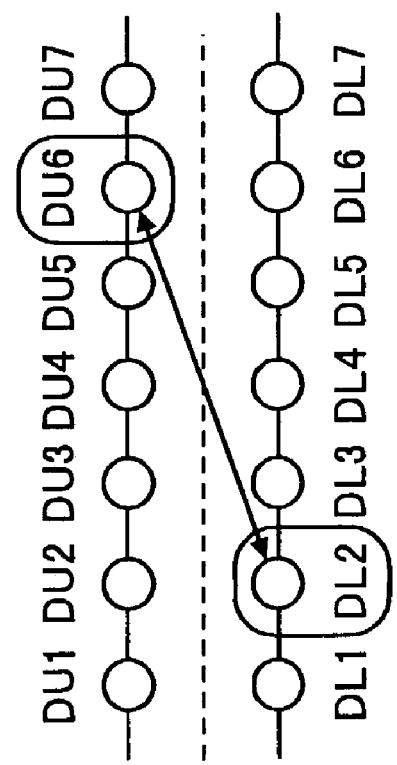
Figure 14A:
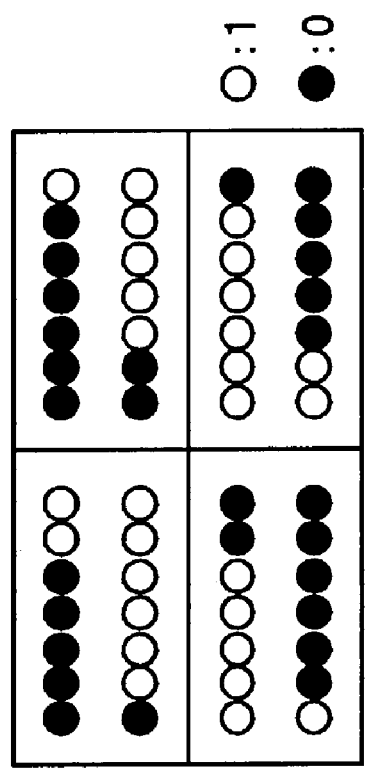
Figure 15A:
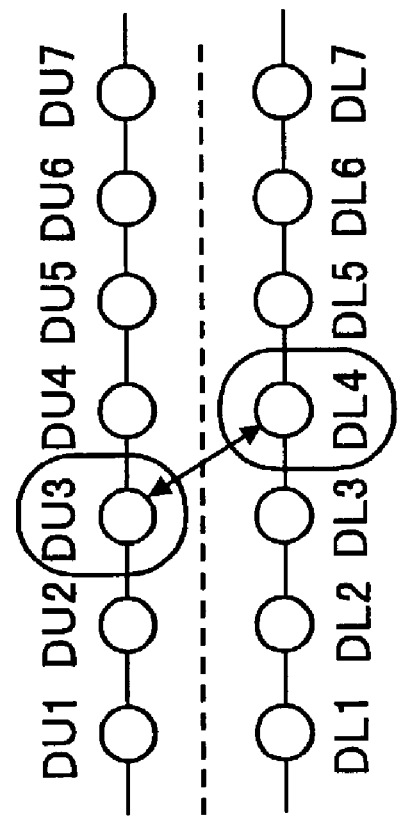
Figure 15B:
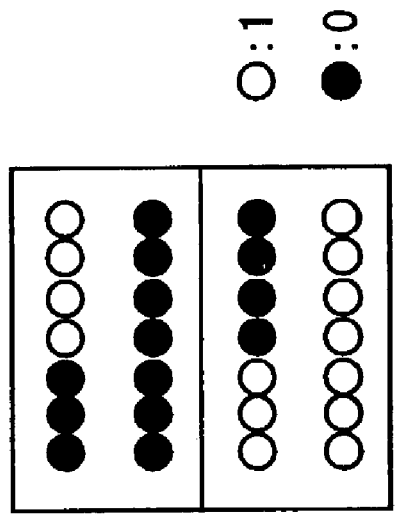
Figure 16B:
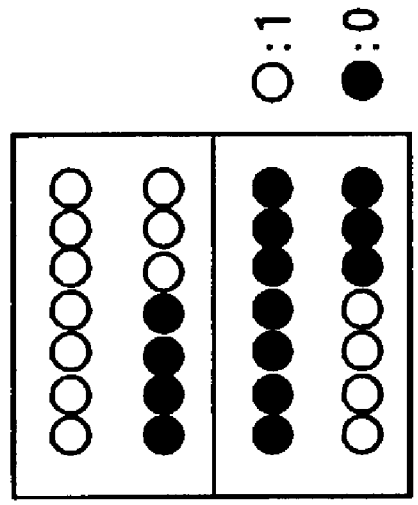
Figure 16A:
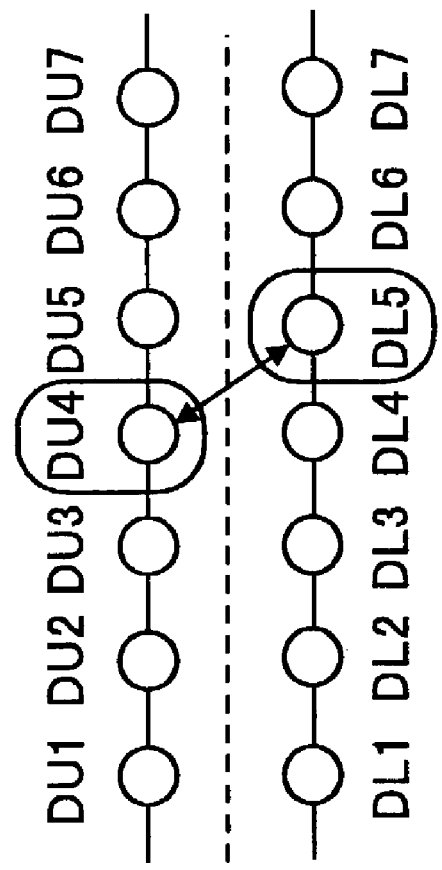
Figure 17B:
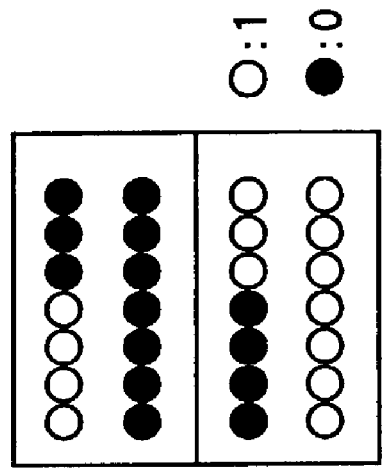
Figure 17A:
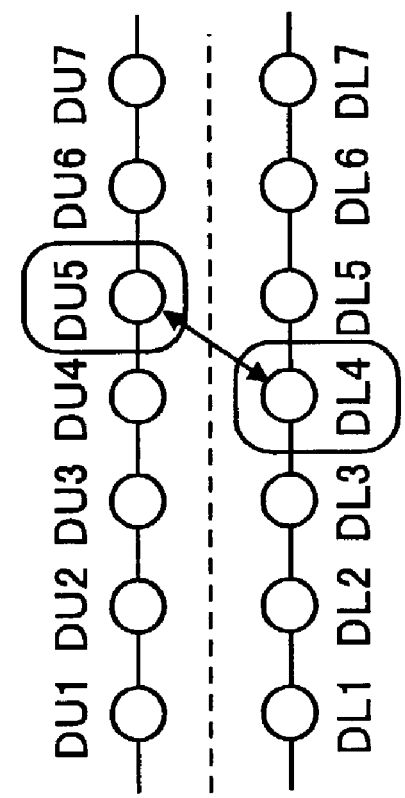
Figure 18A:
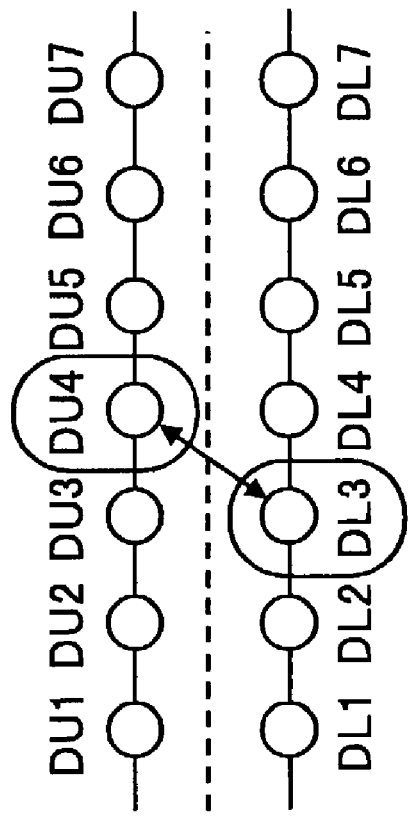
Figure 18B:
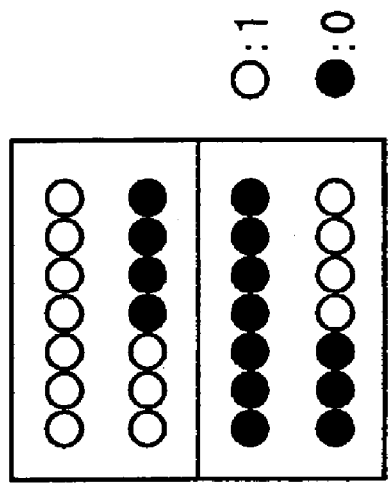
Figure 19B:
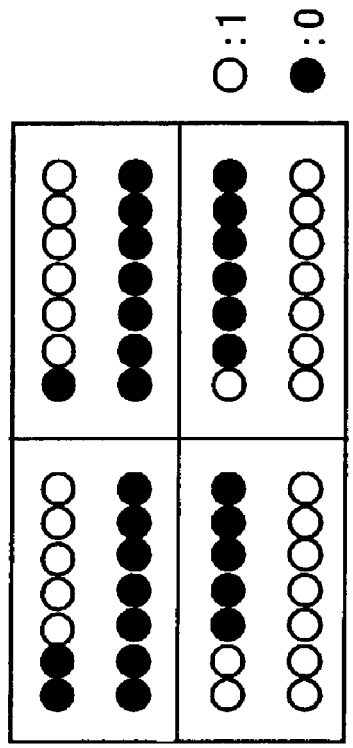
Figure 19A:
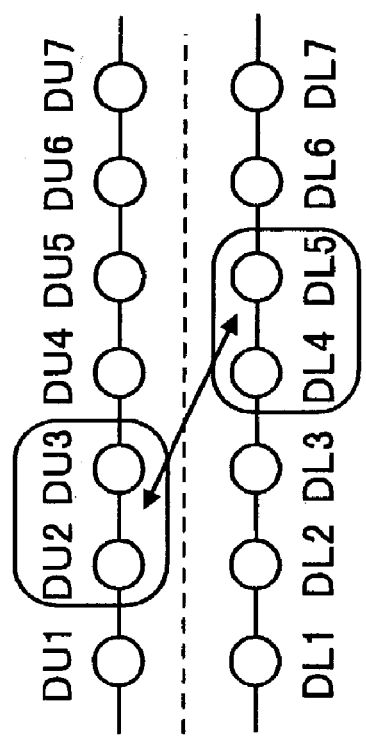
Figure 20B:
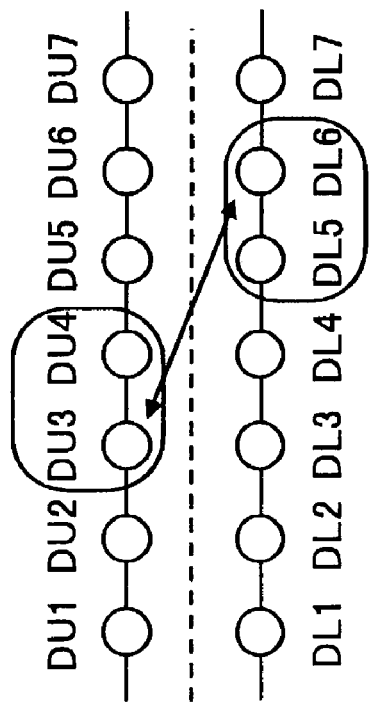
Figure 20A:
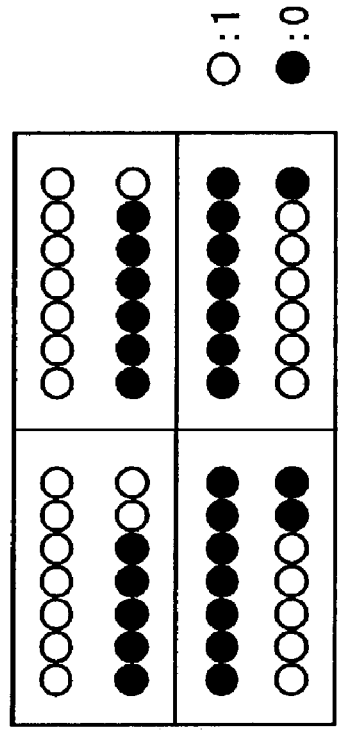
Figure 21B:
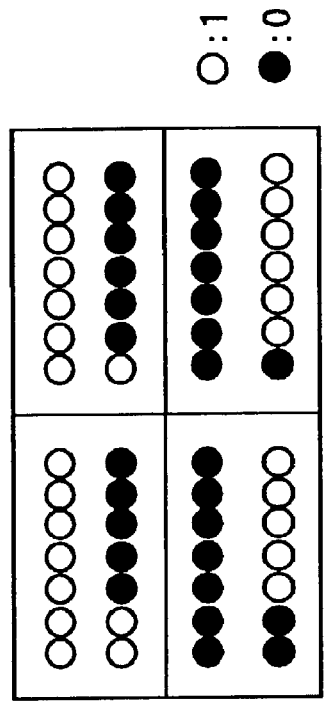
Figure 21A:
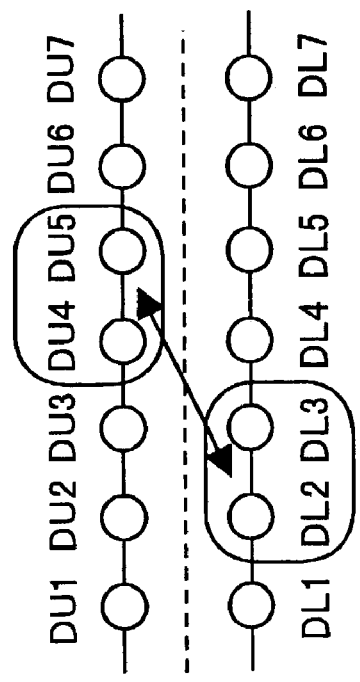
Figure 22B:
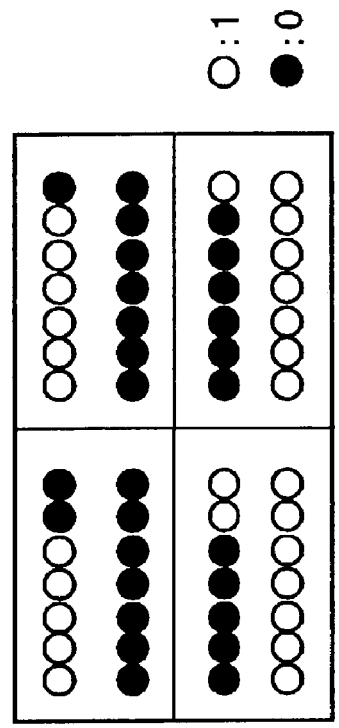
Figure 22A:
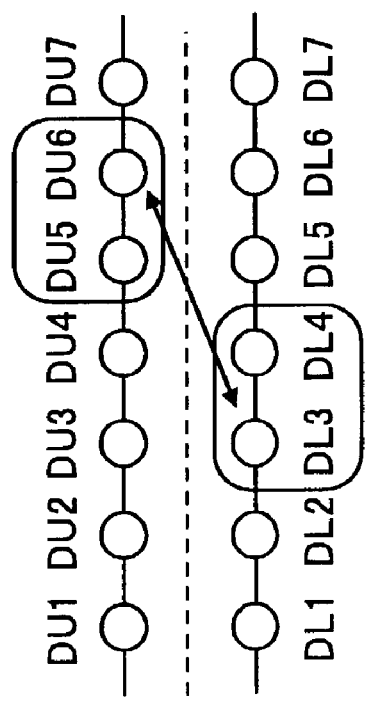

FIGS. 6(A) and 6(B) are diagrams each showing the interpolation direction. As shown in FIGS. 6(A) and 6(B), seventeen patterns of the interpolation directions are designated by the interpolation direction data Ddir.

If the binarized pixel pattern data represents an outline passing through the pixel data DU2 and DU6, the interpolation direction data Ddir designates the interpolation direction 1. If the binarized pixel pattern data represents an outline passing through the pixel data DU3 and DL5, the interpolation direction data Ddir designates the interpolation direction 3. If the binarized pixel pattern data represents an outline passing through intermediate points of the pixel data DU2 and DU3, and the pixel data DL5 and DL6, the interpolation direction data Ddir designates the interpolation direction 2. Likewise, the interpolation direction data Ddir designate the interpolation directions 4 to 17 in accordance with an outline image represented by the binarized pixel pattern data.

If the interpolation direction data Ddir designate the interpolation direction 1, the interpolation pixel data Do is calculated by averaging the pixel data DU2 and DL6. If the interpolation direction data Ddir designate the interpolation direction 2, the interpolation pixel data Do is calculated by averaging the pixel data DU2, DU3, DL5 and DL6. Likewise, the interpolation pixel data Do is calculated by averaging the pixel data, which are located in the interpolation direction designated by the interpolation direction data Ddir.

As shown in FIG. 6, various patterns of interpolation directions are designated by the interpolation direction data Ddir, including interpolation directions 2, 4, 6, 8, 14 to 17, each of which joins intermediate points of the respective pixel data DU2, DU3, DU4, DU5, DU6, DL2, DL3, DL4, DL5, DL6. These interpolation directions correspond to an outline passing between the respective pixel data. Note that the interpolation pixel data Do is calculated based on the pixel data located in the interpolation direction designated by the interpolation data Ddir so as to prevent high frequency components being lost in the interpolation process.

FIGS. 7 to 22 are schematic diagrams each showing (B) a binarized pixel pattern 1 to 17, which is represented by the binarized pixel pattern data, and (A) the corresponding interpolation direction and the pixel data used for calculating the interpolation pixel data Do. In FIGS. 7(B) to 22(B), each open circle "○" represents the binarized pixel data "1", and each solid circle "●" represents the binarized pixeld data "0".

Figure 23:
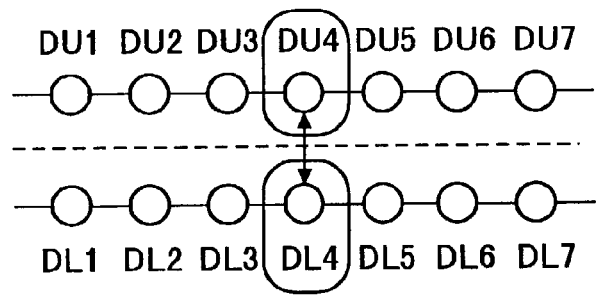

The interpolation pattern table 6 outputs interpolation direction data Ddir which designates the interpolation direction corresponding to the binarized pixel pattern data based on the relations shown in FIGS. 7 to 22. For example, if the binarized pixel pattern data represents the binarized pixel pattern 1 shown in FIG. 7(B), the interpolation pattern table 6 outputs the interpolation direction data Ddir designating the interpolation direction 1. The interpolation circuit 3 calculates interpolation pixel data Do according to the interpolation direction data Ddir. The interpolation pixel data Do is calculated by averaging the pixel data located in the interpolation direction designated by the interpolation direction data Ddir. For example, if the interpolation direction data Ddir designates the interpolation direction 1, the interpolation circuit 3 calculates the interpolation pixel data Do by averaging the pixel data DU2 and DL6. If the binarized pixel pattern data represents none of the binarized pixel pattern 1 to 17 shown in FIGS. 7(B) to 22(B), the interpolation pattern table 6 outputs the interpolation direction data Ddir designating the interpolation direction 5 shown in FIG. 23.

Figure 24:
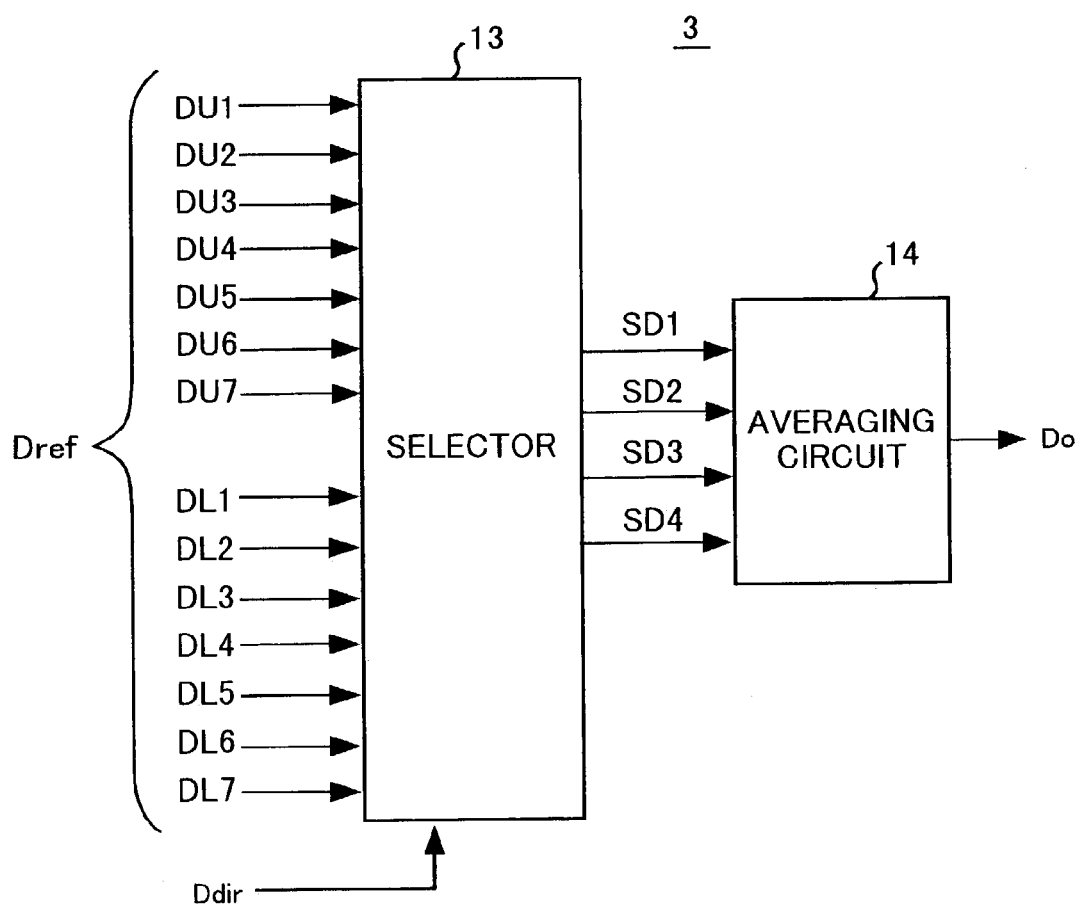

FIG. 24 is a block diagram showing a structure of the interpolation circuit 3. As shown in FIG. 24, the interpolation circuit 3 includes a selector 13 and an averaging circuit 14. The selector 13 selects the pixel data located in the interpolation direction designated by the interpolation direction data Ddir, from the reference pixel data Dref (i.e. the pixel data DU1 to DU7 and DL1 to DL7). Then, the selector 13 sends selected pixel data SD1, SD2, SD3 and SD4 to the averaging circuit 14. If the interpolation direction data Ddir designate the interpolation direction 2 (see FIG. 8), the selector 13 selects DU2, DU3, DL5 and DL6 as the pixel data SD1, SD2, SD3 and SD4. In other words, if the interpolation direction data Ddir designates the interpolation direction joining the intermediate points of the reference pixel data, the selector 13 selects the pixel data located on each side of the respective intermediate points. If the interpolation direction data Ddir designates the interpolation direction 1 shown in FIG. 7, where the interpolation pixel data Do is calculated by averaging two pixel data, the selector 13 selects DU2 as the pixel data SD1 and SD2, and DL6 as the pixel data SD3 and SD4. In this case, the pixel data SD1=SD2=DU2 and SD3=SD4=DL6.

The averaging circuit 14 calculates the average value of the pixel data SD1, SD2, SD3 and SD4, i.e. (SD1+SD2+SD3+SD4)/4, thereby producing the interpolation pixel data Do. If the interpolation direction 2 is designated by the interpolation direction data Ddir, the pixel data SD1=DU2, SD2=DU3, SD3=DL5, and SD4=DL6 are sent to the averaging circuit 14, and the averaging circuit 14 calculates the interpolation pixel data Do=(DU2+DU3+DL5+DL6)/4. If the interpolation direction 1 is designated by the interpolation direction data Ddir, the pixel data SD1=DU2, SD2=DU2, SD3=DL6, SD4=DL6 are sent to the averaging circuit 14, and the averaging circuit 14 calculates the interpolation pixel data Do=(2×DU2+2×DL6)/4=(DU2+DL6)/2.

The pixel interpolation device discussed above calculates the interpolation pixel data Do according to the interpolation direction data Ddir designating various interpolation directions, which corresponds with outline image around the interpolation pixel data Do. Furthermore, the interpolation direction data Ddir designates the interpolation direction joining the intermediate points of the pixel data. In this case, the interpolation data Do is calculated by averaging the pixel data located on each side of the respective intermediate points so that the high frequency components are preserved in the interpolated image.

Figure 25:
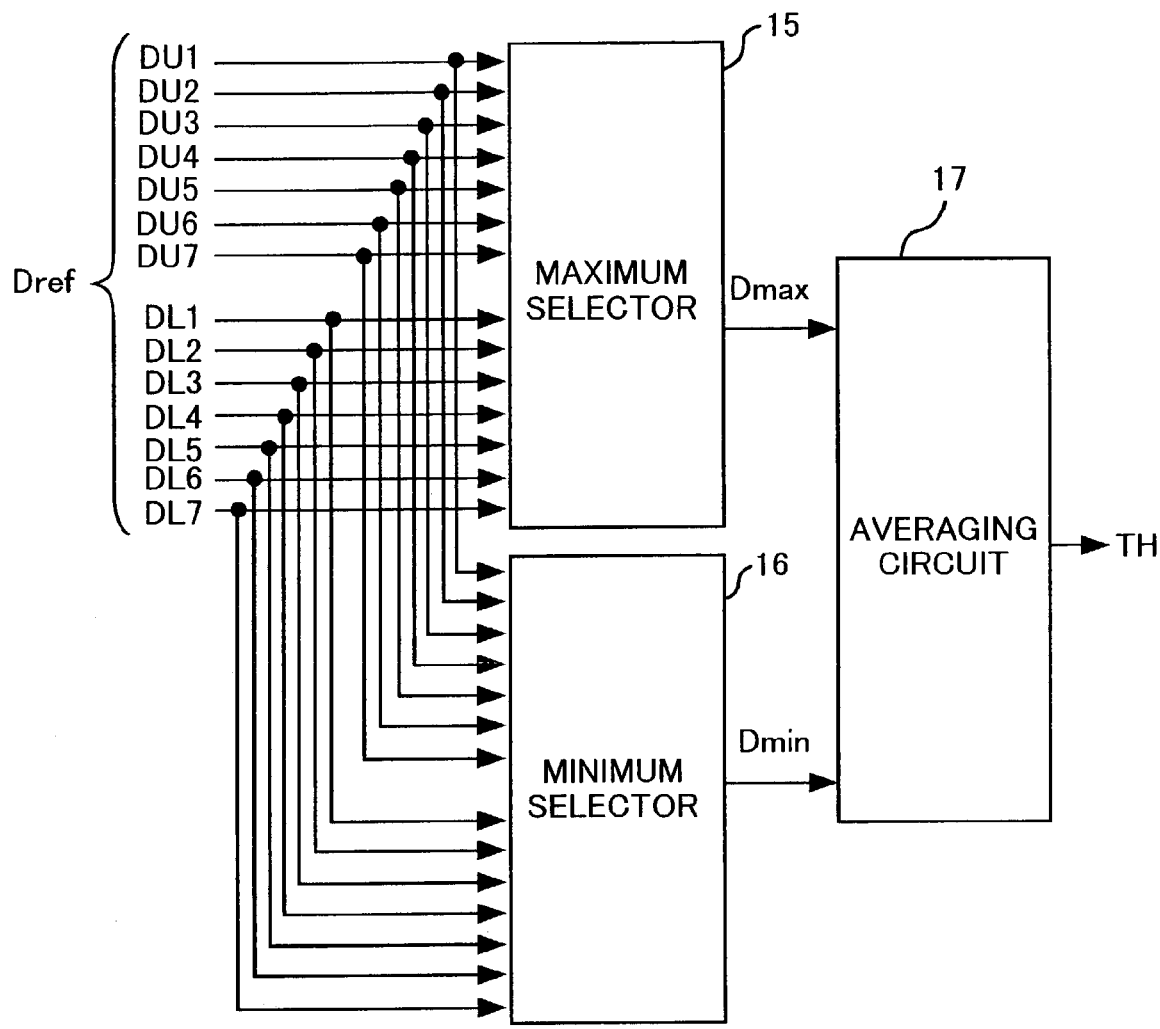

FIG. 25 is a block diagram showing another structure of the threshold value calculating circuit 4. A maximum selector 15 selects maximum one of the pixel data from the reference pixel data Dref (DU1 to DU7 and DL1 to DL7) and outputs it as a maximum data Dmax. At the same time, a minimum selector 16 selects minimum one of the pixel data from the reference pixel data Dref and outputs it as a minimum data Dmin. An averaging circuit 17 calculates the average value of the maximum data Dmax and the minimum data Dmin, i.e. (Dmax+Dmin)/2, and outputs it as the threshold value data TH. Thus, the threshold value data TH may be calculated by averaging the maximum and the minimum of the reference pixel data Dref.

Figure 26:
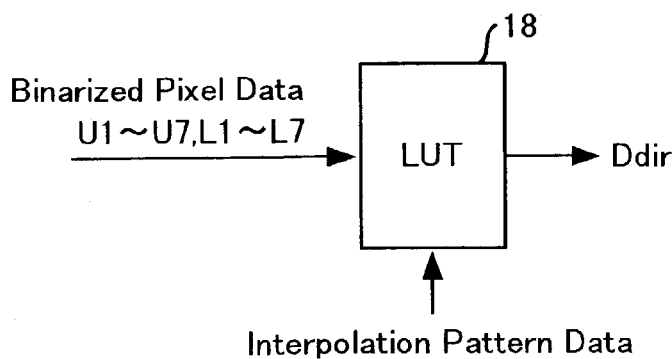
Figure 27B:
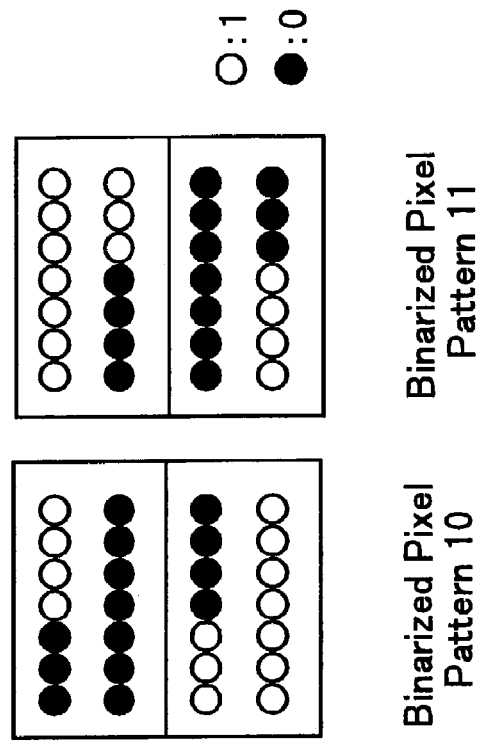
Figure 27A:
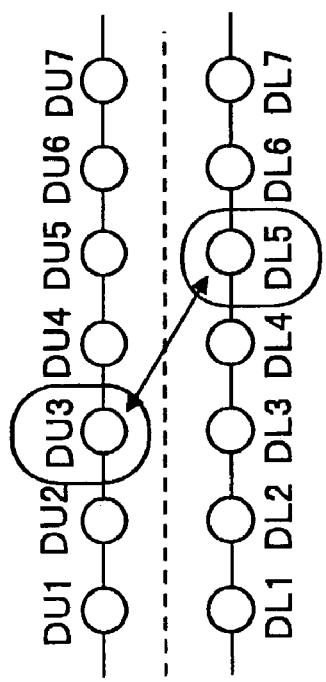
Figure 28B:
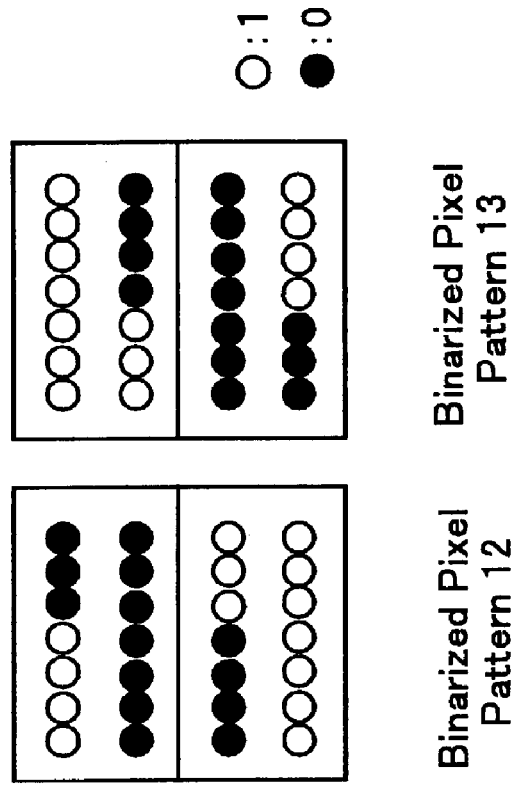
Figure 28A:
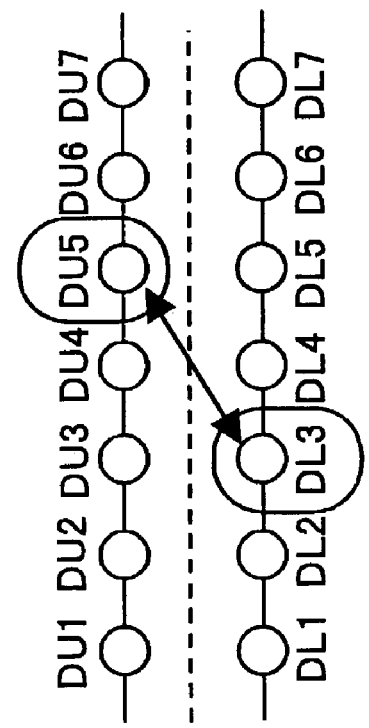
Figure 29A:
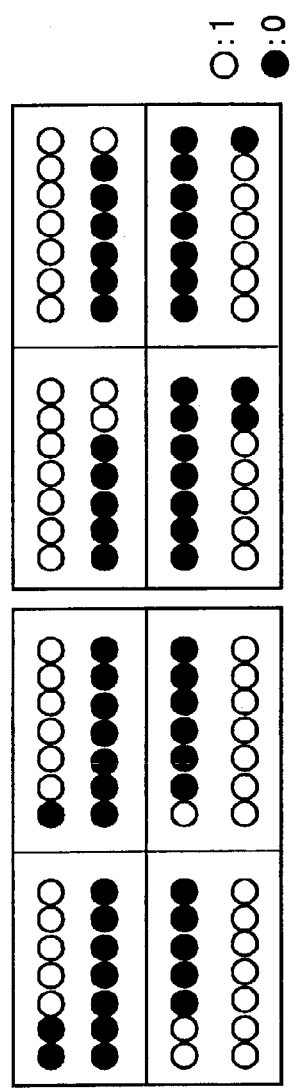
Figure 29B:
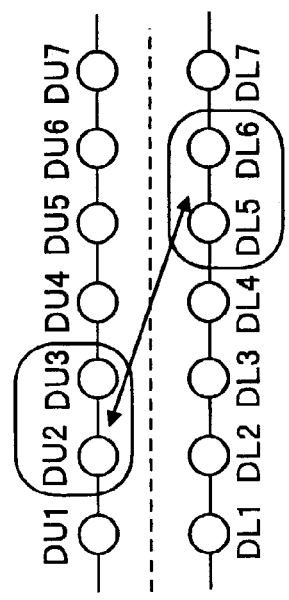
Figure 30A:
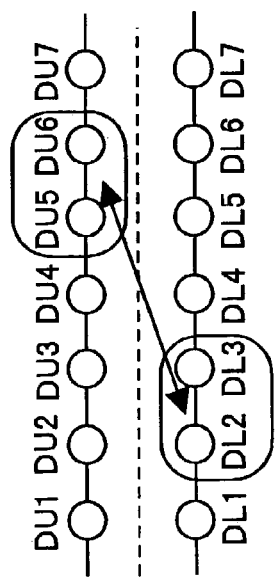
Figure 30B:
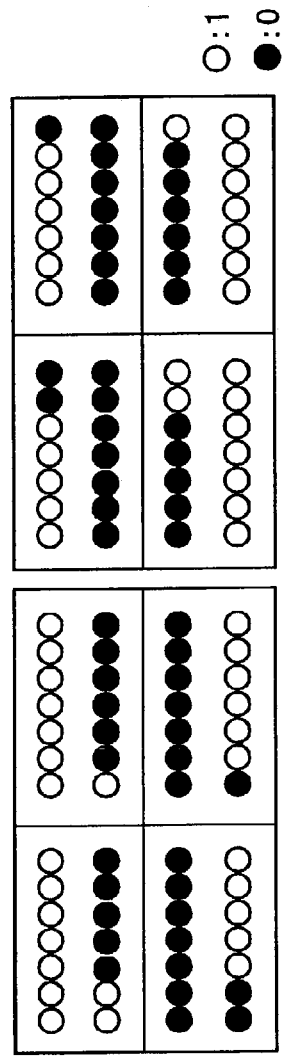

FIG. 26 is a block diagram showing another structure of the interpolation pattern table 6. A look up table (LUT) 18 stores the interpolation pattern data Ddir corresponding to each of the binarized pixel patterns shown in FIGS. 7 to 23. The contents of the LUT 18 are adjustable by users. The LUT 18 outputs the interpolation direction data Ddir corresponding to the binarized pixel pattern, shown in FIGS. 7 to 22. The interpolation pattern table 6 using the LUT 18 allows users to adjust frequency band of the interpolated image.

FIGS. 27 to 30 are schematic diagrams each showing another combination of (B) the binarized pixel pattern, and (A) the corresponding interpolation direction. As shown in FIGS. 27, 28, 29 and 30, the interpolation direction 3 corresponds to the binarized pixel pattern 10 and 11 shown in FIGS. 15(B) and 16(B), the interpolation direction 7 corresponds to the binarized pixel pattern 12 and 13 shown in FIGS. 17(B) and 18(B), the interpolation direction 2 corresponds to the binarized pixel pattern 14 and 15 shown in FIGS. 19(B) and 20(B), and the interpolation direction 8 corresponds to the binarized pixel pattern 16 and 17. By using the LUT 18, the combinations of the binarized pixel pattern and the corresponding interpolation direction can be changed.

The number of the pixel data composing the reference pixel data Dref may be increased more than 7×2 (see FIG. 3), for example, 9×2. By increasing the number of the pixel data of the reference pixel data Dref, the interpolation pixel data Do is calculated more accurately.

Second Embodiment

The second embodiment relates to a line interpolation device, which includes the pixel interpolation device according to the first embodiment. The line interpolation device according to the second embodiment is mainly used to convert a interlace image into a non-interlace image.

FIG. 31 is a diagram showing a structure of the line interpolation device according to the second embodiment. As shown in FIG. 31, the line interpolation device according to the second embodiment includes reference pixel extracting circuits 1a, 1b and 1c, interpolation pattern determining units 2a, 2b and 2c, interpolation circuits 3a, 3b and 3c, and selectors 19a, 19b and 19c. The reference pixel extracting circuits 1a, 1b and 1c, interpolation pattern determining units 2a, 2b and 2c, and interpolation circuits 3a, 3b and 3c shown in FIG. 31 correspond to the reference pixel extracting circuit 1, interpolation pattern determining unit 2 and interpolation circuit 3 described in the first embodiment.

Image data Ri, Gi and Bi, which represent a color interlace image, are inputted to the reference pixel extracting circuits 1a, 1b and 1c. The reference pixel extracting circuits 1a, 1b and 1c extract reference pixel data Rref, Gref and Bref, each of which consists of the pixel data DU1, DU2, DU3, DU4, DU5, DU6, DU7, DL1, DU2, DU3, DU4, DU5, DU6 and DL7 shown in FIG. 3, from the image data Ri, Gi and Bi. The reference pixel data Rref, Gref and Bref are sent to the interpolation pattern determining units 2a, 2b and 2c, interpolation circuits 3a, 3b and 3c, and the selectors 19a, 19b and 19c.

The interpolation pattern determining units 2a, 2b and 2c output interpolation direction data Rdir, Gdir and Bdir based on the reference pixel data Rref, Gref and Bref. The interpolation circuits 3a, 3b and 3c calculate interpolation pixel data Ro, Go and Bo according to the interpolation direction designated by the interpolation direction data Rdir, Gdir and Bdir, by performing calculations described in the first embodiment. The interpolation pixel data Ro, Go and Bo are sent to the selectors 19a, 19b and 19c.

Figure 32:
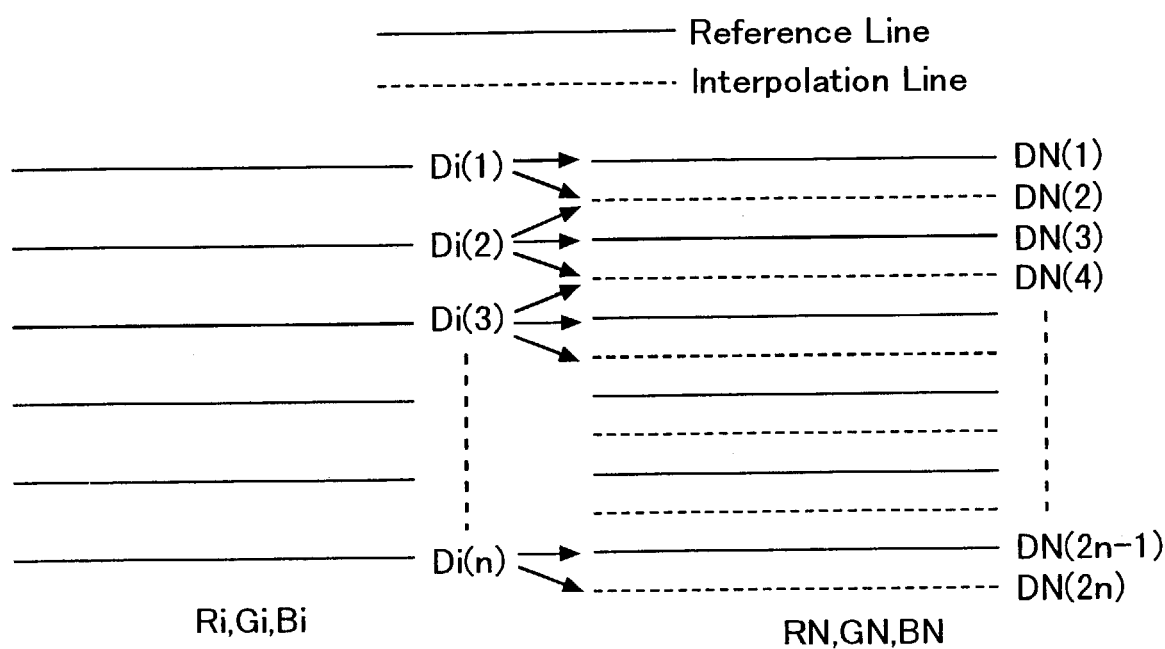
FIG. 32 is a schematic diagram showing reference lines and interpolation lines.

FIG. 32 is a schematic diagram showing n lines of the interlace image represented by the image data Ri, Gi and Bi, and n×2 lines of the non-interlace image represented by image data RN, GN and BN. In FIG. 32, solid lines indicated by DN(1), D(3), . . . DN(2n−1) are original lines Di(n), and broken lines indicated by D(2), DN(4), . . . DN(2n) are interpolation lines, each of which consisting of the interpolation pixel data Ro, Go and Bo. As shown in FIG. 32, the non-interlace image is produced by inserting the interpolation lines between the original lines.

The selector 19a outputs the interpolation line consisting of the interpolation pixel data Ro and the reference line consisting of the reference pixel data Rref alternately, thereby producing the image data RN representing R component of the non-interlace image. Likewise, the selector 19b and 19c, produce the image data GN and BN representing G and B components of the non-interlace image, by outputting the interpolation lines consisting of the interpolation pixel data Go and Bo, and the reference line consisting of the reference pixel data Gref and Bref alternately. The image data RN, GN and BN representing the non-interlace image are sent to a display device 20.

By applying the pixel interpolation device according to the first embodiment to the line interpolating circuit, as shown in FIG. 31, the interlace to non-interlace conversion is performed without losing the high-frequency components.

Third Embodiment

Figure 33:
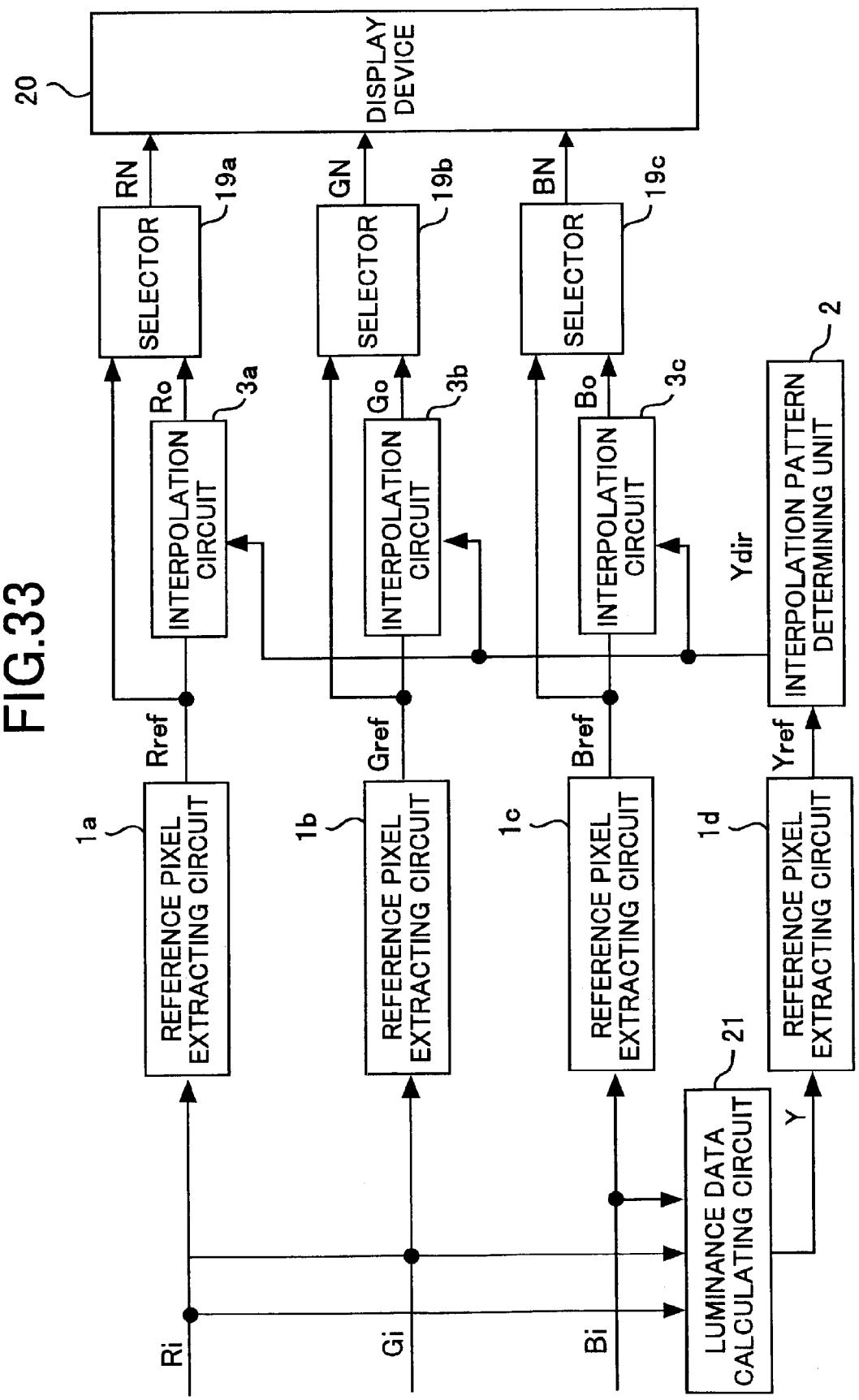

FIG. 33 is a block diagram showing a structure of the line interpolation device according to the third embodiment. The image data Ri, Gi and Bi representing the interlace image is inputted to the reference pixel extracting circuits 1a, 1b and 1c and a luminance data calculating circuit 21. The luminance data calculating circuit 21 derives luminance data Y from the image data Ri, Gi and Bi. The luminance data Y can be calculated by following equation;

$$Y = 0.3 \times Ri + 0.59 \times Gi + 0.11 \times Bi \quad (1).$$

A reference pixel extracting circuit 1d extracts the pixel data DU1, DU2, DU3, DU4, DU5, DU6, DU7, DL1, DU2, DU3, DU4, DU5, DU6 and DL7 shown in FIG. 3 from the luminance data Y, and outputs them as reference luminance data Yref.

The interpolation pattern determining unit 2 outputs interpolation direction data Ydir designating the interpolation direction based on the binarized pixel pattern obtained by binarizing the reference luminance data Yref. The interpolation circuits 3a, 3b and 3c calculate the interpolation pixel data Ro, Go and Bo according to the interpolation direction data Ydir.

The selectors 19a, 19b and 19c outputs the interpolation line consisting of the interpolation pixel data Ro, Go and Bo, and the reference line consisting of the reference pixel data Rref, Gref and Bref, alternately, thereby producing the image data RN, GN and BN representing the non-interlace image. The image data RN, GN and BN, which represent non-interlace image are sent to a display device 20.

The line interpolation device according to the third embodiment determines the interpolation direction based on the binarized pixel pattern obtained from the luminance data Y. In other words, the interpolation pixel data Ro, Go and Bo are calculated with the same interpolation direction. Therefore, smooth outlines are obtained in the interpolated image. Additionally, the line interpolation device according to the fourth embodiment requires less circuit scale, since it uses single interpolation direction determining circuit 2 as shown in FIG. 33.

Forth Embodiment

Figure 34:
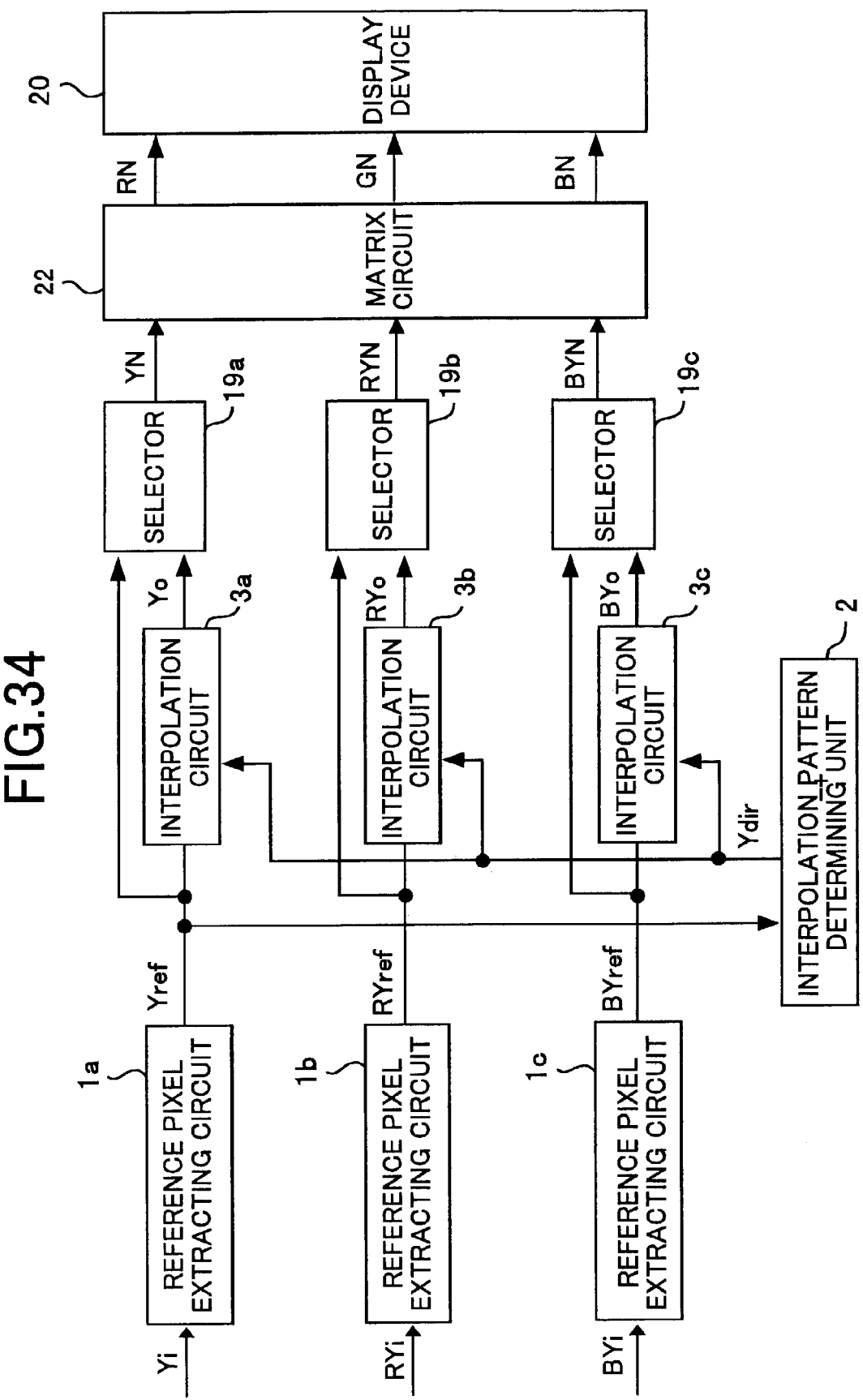

FIG. 34 is a block diagram showing the line interpolation device according to the forth embodiment. The luminance data Yi, R-Y color difference data RYi and B-Y color difference data BYi representing the interlace image are inputted to the reference pixel extracting circuits 1a, 1b and 1c. The reference pixel extracting circuits 1a, 1b and 1c extract the pixel data DU1, DU2, DU3, DU4, DU5, DU6, DU7, DL1, DL2, DL3, DL4, DL5, DL6 and DL7 shown in FIG. 3 from the luminance data Yi, the R-Y color difference data RYi and the B-Y color difference data BYi, and output them as reference pixel data Yref, RYref and BYref, respectively. The reference pixel data Yref, RYref and BYref are sent to the interpolation circuits 3a, 3b and 3c, and selectors 19a, 19b and 19c. The reference pixel data Yref is sent to the interpolation pattern determining unit 2.

The interpolation pattern determining unit 2 outputs interpolation direction data Ydir designating the interpolation direction corresponding to the binarized pixel pattern obtained by binarizing the reference luminance data Yref. The interpolation circuits 3a, 3b and 3c calculate the interpolation pixel data Yo, RYo and BYo according to the interpolation direction data Ydir.

The selector 19a outputs the interpolation line consisting of the interpolation pixel data Yo and the reference line consisting of the reference pixel data Yref alternately, thereby producing the image data YN representing luminance component of the non-interlace image. Likewise, the selectors 19b and 19c output the interpolation line consisting of the interpolation pixel data RYo and BYo, and the reference line consisting of the reference pixel data RYref and BYref alternately, thereby producing the image data RYN and BYN representing R-Y and B-Y color difference components of the non-interlace image. The image data YN, RYN and BYN are sent to a matrix circuit 22.

The matrix circuit 22 produces the image data RN, GN and BN by performing matrix conversion on the image data YN, RYN and BYN. The matrix conversion is represented by a following equation;

$$\begin{bmatrix} RN \\ GN \\ GN \end{bmatrix} = \begin{bmatrix} 1 & 1 & 0 \\ 1 & -0.51 & -0.19 \\ 1 & 0 & 1 \end{bmatrix} \begin{bmatrix} YN \\ RYN \\ BYN \end{bmatrix} \quad (2)$$

The image data RN, GN and BN are sent to a display device 20.

The line interpolation device according to the fourth embodiment determines the interpolation direction based on the binarized pixel data obtained from the luminance data Y. In other words, the interpolation pixel data Ro, Go and Bo are calculated with the same interpolation direction. Therefore, smooth outlines are obtained in the interpolated image. Additionally, the line interpolation device according to the third embodiment requires less circuit scale, since it uses single interpolation direction determining circuit 2 as shown in FIG. 34.

Fifth Embodiment

Figure 35:
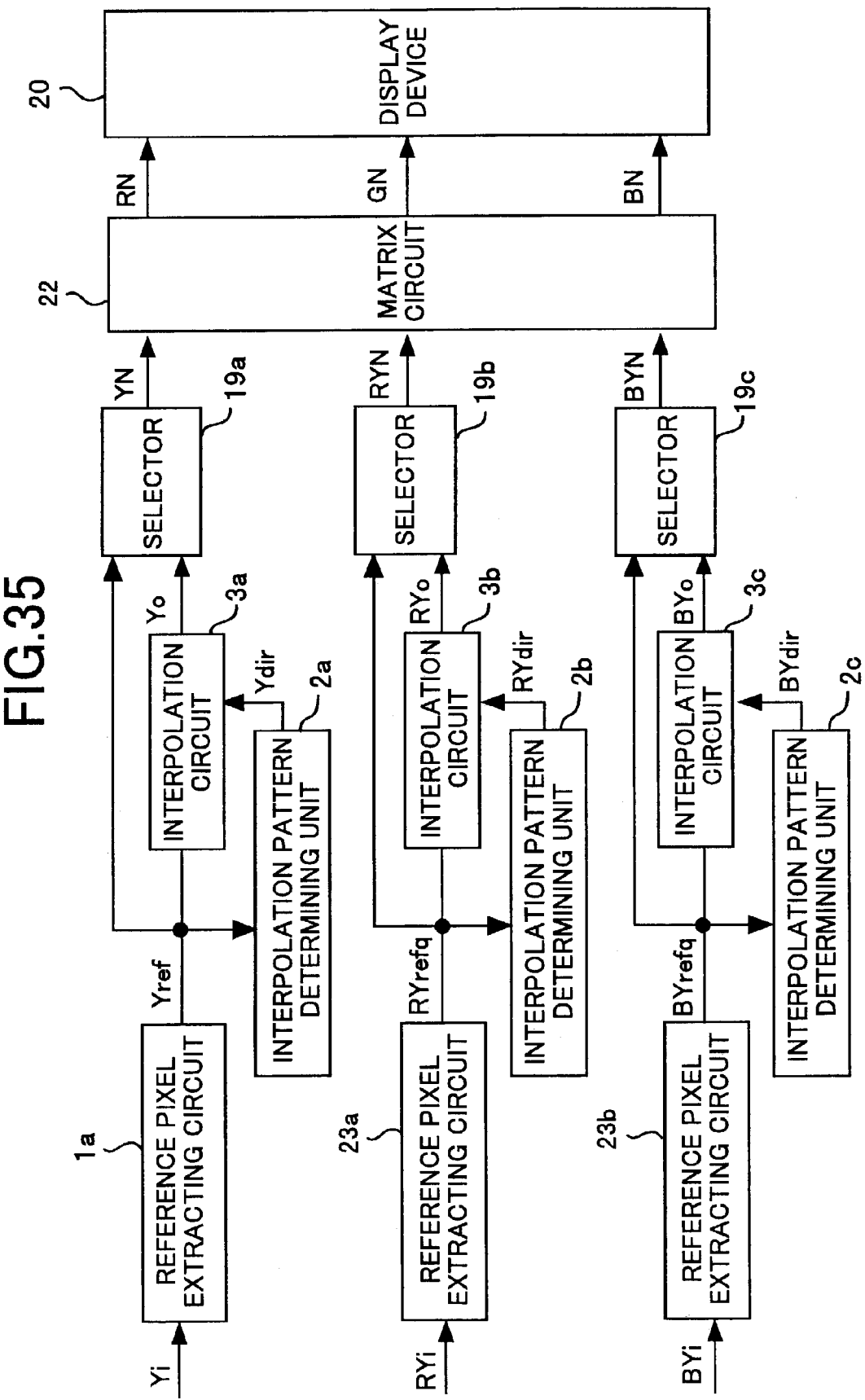
Figure 37:
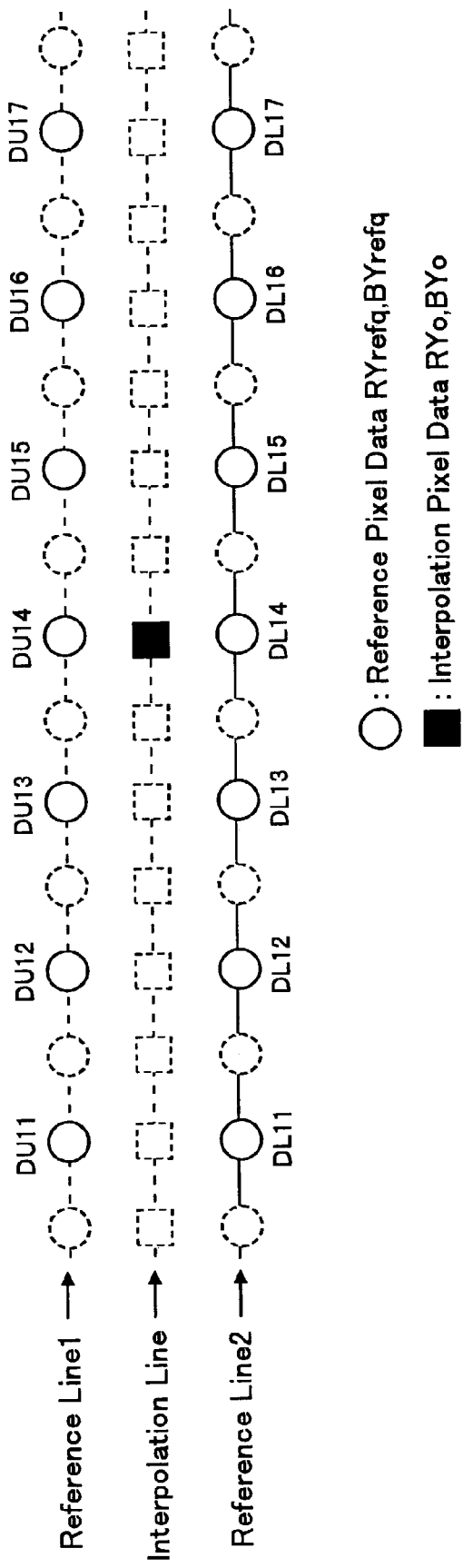

FIG. 35 is a diagram showing the structure of the line interpolation device according to the fifth embodiment. The luminance data Yi, R-Y color difference data RYi and B-Y color difference data BYi representing the interlace image are inputted to the reference pixel extracting circuits 1a, 23a and 23b. The reference pixel extracting circuits extracts the reference pixel data Yref consisting of the pixel data DU1, DU2, DU3, DU4, DU5, DU6, DU7, DL1, DL2, DL3, DL4, DL5, DL6 and DL7 shown in FIG. 3 from the luminance data Yi. At the same time, the reference pixel extracting circuits 23a and 23b extract the reference pixel data RYrefq and BYrefq from the color difference data RYrefq and BYrefq. FIG. 37 is a schematic diagram showing the reference pixel data RYrefq and BYrefq. As shown in FIG. 37, the reference pixel data RYrefq and BYrefq consists of a plurality of pixel data DU11, DU12, DU13, DU14, DU15, DU16 and DU17, and DL11, DL12, DL13, DL14, DL15, DL16 and DL17, each of which represents the pixel lying on the reference lines 1 and 2 at one pixel interval.

Figure 36:
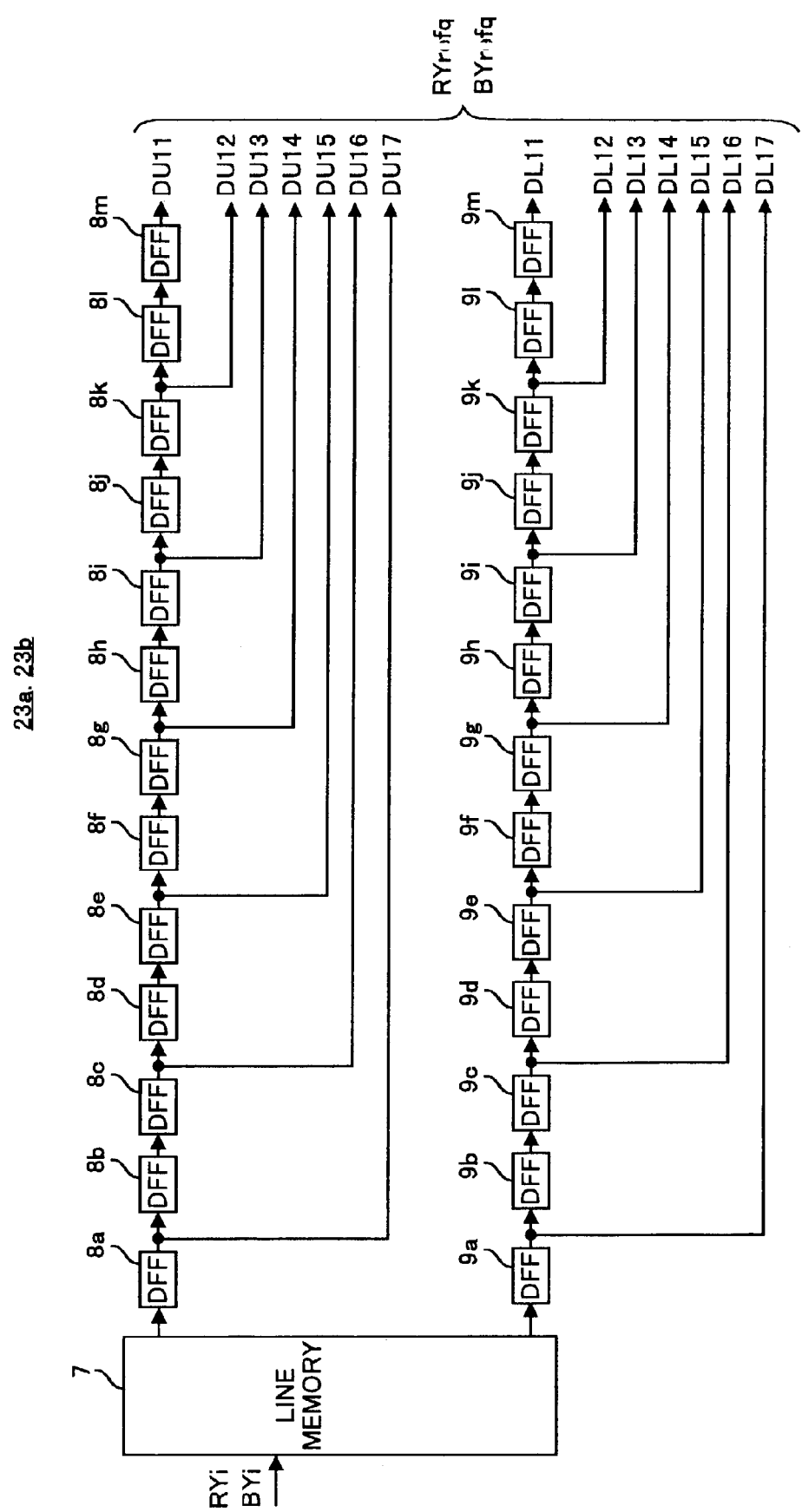

FIG. 36 is a diagram showing a structure of the reference pixel extracting circuits 23a and 23b. The line memory 7 holds the pixel data composing adjacent two lines (i.e. the reference lines 1 and 2) from the color difference data RYi and BYi. The pixel data stored in the line memory 7 are sent to the DFF 8a and DFF 9a. Each of the DFFs 8a, 8b, 8c, 8d, 8e, 8f, 8h, 8i, 8j, 8k, 8l, 8m, 9a, 9b, 9c, 9d, 9e, 9f, 9g, 9h, 9i, 9j, 9k, 9l and 9m delays the respective pixel data inputted thereto by one dot period. The DFFs 8a, 8c, 8e, 8g, 8i, 8k and 8m output the pixel data DU17, DU16, DU15, DU14, DU13, DU12 and DU11, and the DFFs 9a, 9c, 9e, 9g, 9i, 9k and 9m output the pixel data DL17, DL16, DL15, DL14, DL13, DL12 and DL11, respectively.

The interpolation pattern determining units 2b and 2c determine the interpolation direction based on the binarized pixel patterns obtained by binarizing the reference pixel data RYrefq and BYrefq, and output the interpolation direction data RYdir and BYdir designating the interpolation direction. On the other hand, the interpolation pattern determining unit 2a determines the interpolation direction based on the binarized patterns obtained by binarizing the reference pixel data Yref. The interpolation circuit 3a, 3b and 3c calculates the interpolation pixel data Yo, RYo and BYo according to the interpolation direction designated by the interpolation direction data Ydir, RYdir and Bydir.

Generally, the color difference signals have lower frequency components than the luminance signals. Therefore, the interpolation pixel data RYo and BYo are calculated more accurately by using the pixel data DU11, DU12, DU13, DU14, DU15, DU16 and DU17, and DL11, DLl2, DL13, DL14, DL15, DL16 and DL17, each of which represents the pixel lying on the reference lines 1 and 2 at one pixel interval.

Sixth Embodiment

The sixth embodiment relates to another structure of the line interpolation device, which converts interlace image data to non-interlace image data, wherein a ratio of the luminance data, the B-Y and R-Y color difference data is 4:2:2.

Figure 38:
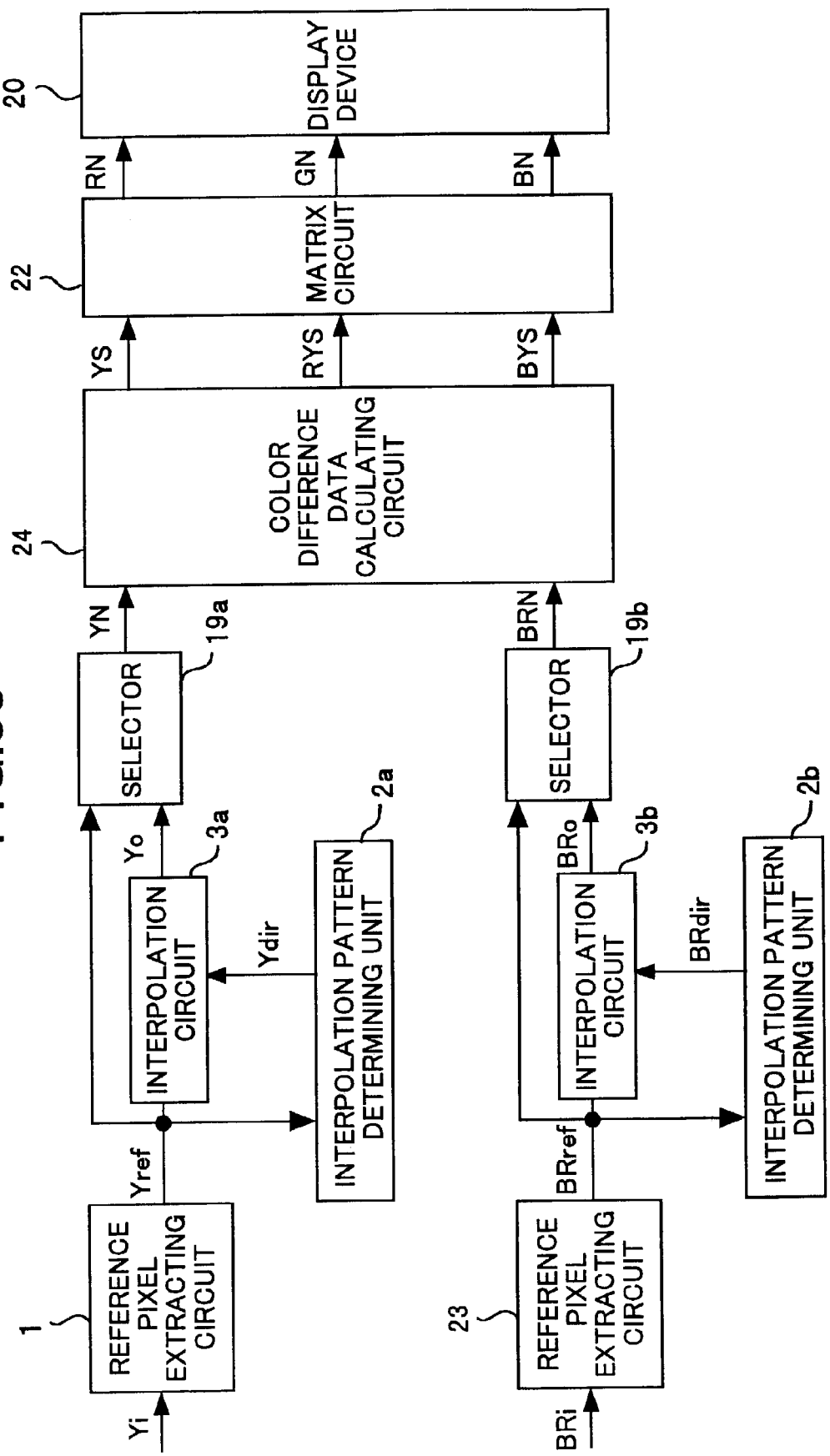

FIG. 38 is a diagram showing a structure of the line interpolation device according to the sixth embodiment. A luminance data Yi and color difference data BRi, are inputted to the reference pixel extracting circuits 1 and 23, respectively.

Figure 39A:
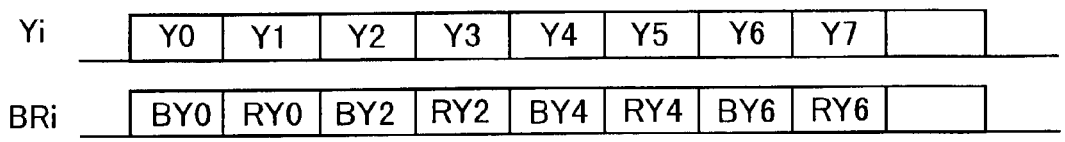
FIG. 39 is a diagram showing a data structure of an image data.

FIG. 39 is a schematic diagram showing (A) the luminance data Yi and color difference data BRi, and (B) the luminance data Y, R-Y and B-Y color difference data RY and BY. In FIG. 39(A) "Y0", "Y1", "Y2", "Y3", ... designate the luminance data corresponding to respective pixels. "BY0", "BY2", "BY4", "BY6", ... designate the B-Y color difference data, and "RY0", "RY2", "BY4", "BY6", ... designate the R-Y color difference data. Each of the R-Y and B-Y color difference data RY0 and BY0 corresponds to the luminance data Y0 and Y1, and each of the color difference data BY2 and RY2 corresponds to the luminance data Y2 and Y3. As shown in FIG. 39(A), data amount of the respective R-Y and B-Y color difference data included in the color difference data BRi is half of the luminance data Yi.

Figure 39B:
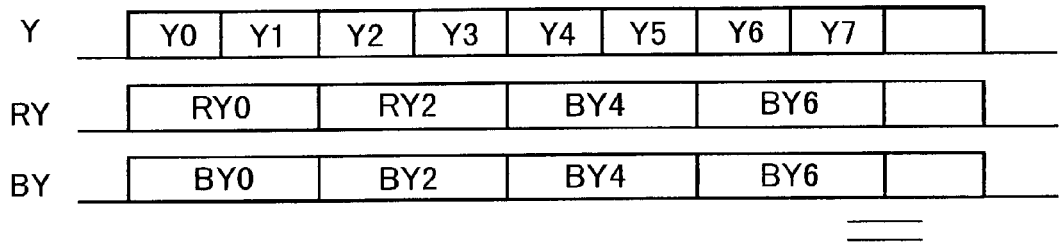

FIG. 39(B) is a schematic diagram showing the image data, wherein a ratio of the luminance data, B-Y and R-Y color difference data is 4:4:4.

The reference pixel extracting circuit 1 extracts a reference pixel data Yref consisting of the pixel data DU1 to DU7 and DL1 to DL7 shown in FIG. 3, from the luminance data Yi. The reference pixel data Yref is sent to the interpolation pattern determining unit 2a, interpolation circuit 3a and selector 19a. The interpolation pixel data Yo is calculated using the reference pixel data Yref.

At the same time, the reference pixel extracting circuit 23 extracts a reference pixel data RBref consisting of the pixel data DU11 to DU17 and DL11 to DL17 shown in FIG. 37.

As shown in FIG. 39(A), the color difference data BRi consists of the B-Y and R-Y color difference data arranging alternately. Therefore, a plurality of pixel data, which represent B-Y and R-Y color data, are alternately outputted as the reference pixel data BRref. Accordingly, the interpolation calculating circuit 3b alternately produces the interpolation pixel data corresponding to the R-Y color difference data and the B-Y color difference data as the interpoation data BRo.

The selector 19a alternately outputs the reference line consisting of a plurality of the reference pixel data Yref and the interpolation line consisting of a plurality of the interpolation pixel data Yo, thereby producing a luminance image data YN representing the non-interlace image. Likewise, the selector 19b alternately outputs the reference line consisting of a plurality of the reference pixel data BRref and the interpolation line consisting of a plurality of the interpolation pixel data BRo, thereby producing a color difference image data BRN representing the non-interlace image.

A color difference data calculating circuit 24 converts the luminance image data YN and color difference image data BRN into a luminance image data YS, R-Y and B-Y color difference image RYS and BYS. The matrix circuit 22 generates the image data RN, GN and BN by performing the matrix conversion described in the forth embodiment on the luminance image data YS and the color difference image data RYS and BYS.

Seventh Embodiment

Figure 40:
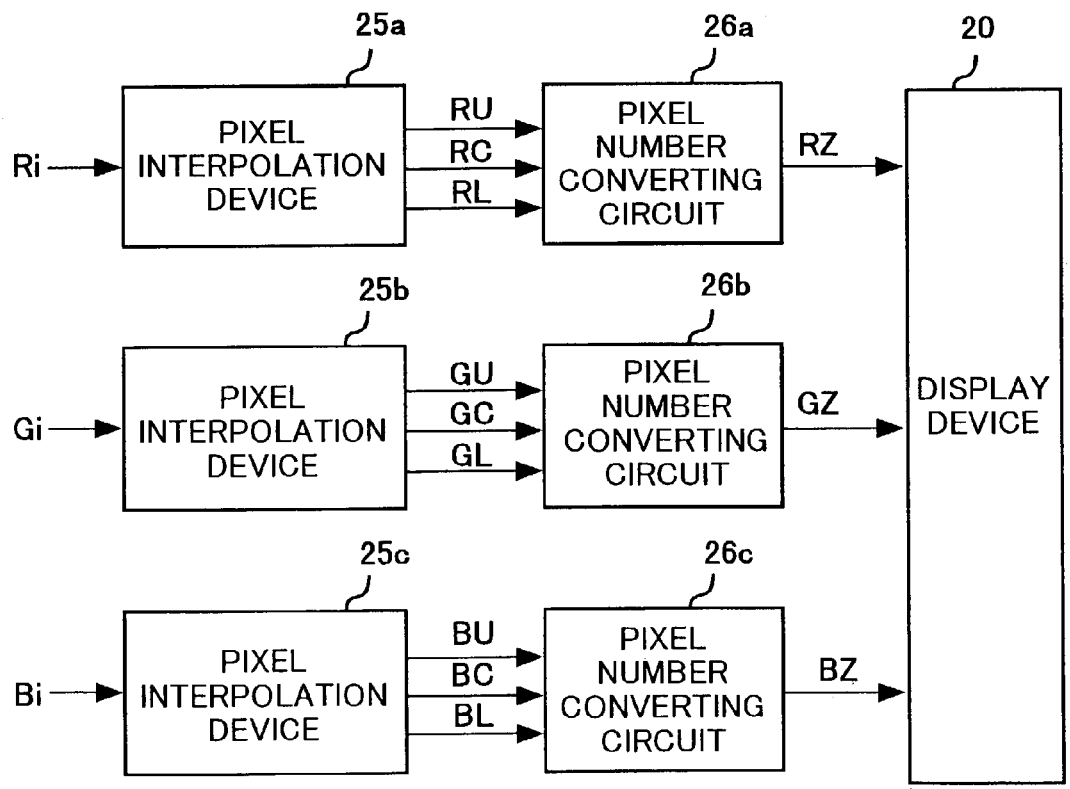
FIG. 40 is a block diagram showing a structure of an image size conversion device according to the seventh embodiment.

The seventh embodiment relates to an image size conversion device including the pixel interpolation device according to the first embodiment. FIG. 40 is a block diagram showing a structure of the image size conversion device according to the seventh embodiment. As shown in FIG. 40, the image size conversion device according to the seventh embodiment includes pixel interpolation devices 25a, 25b and 25c and pixel number converting devices 26a, 26b and 26c. Image data Ri, Gi and Bi representing a first image are sent to the pixel interpolation devices 25a, 25b and 25c. The pixel number conversion circuits 26a, 26b and 26c produce image data RZ, GZ and BZ representing a second image corresponding to the first image of different size.

FIG. 41 is a diagram showing a structure of the pixel interpolation devices 25a, 25b and 25c. Each structure of the pixel interpolation devices 25a, 25b and 25c is similar to that of the interpolation device according to the first embodiment shown in FIG. 1. As shown in FIG. 41, each of the pixel interpolation devices 25a, 25b and 25c outputs a centerline data DC, an upper line data DU and a lower line data DL.

The centerline data DC corresponds to the interpolation pixel Do, the upper line data DU corresponds to the pixel data DU4 located above the interpolation pixel data Do, and the lower line data DL corresponds to the pixel data DL4 located under the interpolation pixel data Do (see FIG. 3).

In FIG. 41, the upper line data DU, the center line data DC, and the lower line data DL outputted by the pixel interpolation circuits 25a, 25b and 25c are designated as "RU", "GU" and "BU", "RC", "GC" and "BC", and "RL", "GL" and "BL", respectively. The pixel number conversion circuits 26a, 26b and 26c produce image data RZ, GZ and BZ based on the upper line data RU, GU and BU, the center line data RC, GC and BC and the lower line data RL, GL and BL.

Figure 42A:
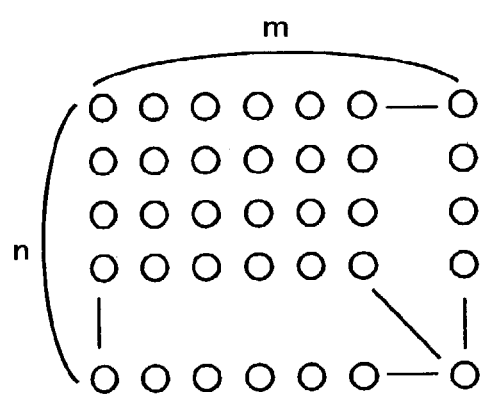
FIGS. 42 to 45 are schematic diagrams for explaining an operation of the pixel interpolation device according to the seventh embodiment.
Figure 42B:
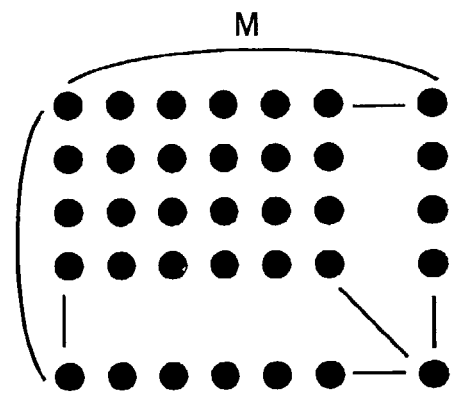

FIG. 42 is a schematic diagram showing (A) the image data Ri, Gi and Bi of m×n dots and (B) the image data RZ, GZ and BZ of M×N dots, which means a horizontal conversion scale and a vertical conversion scale are M/m and N/n. In FIG. 42, each open circle "○" represents individual pixel data of the image data Ri, Gi and Bi, and each solid circle "●" represents individual pixel data of the image data RZ, GZ and BZ.

Figure 43:
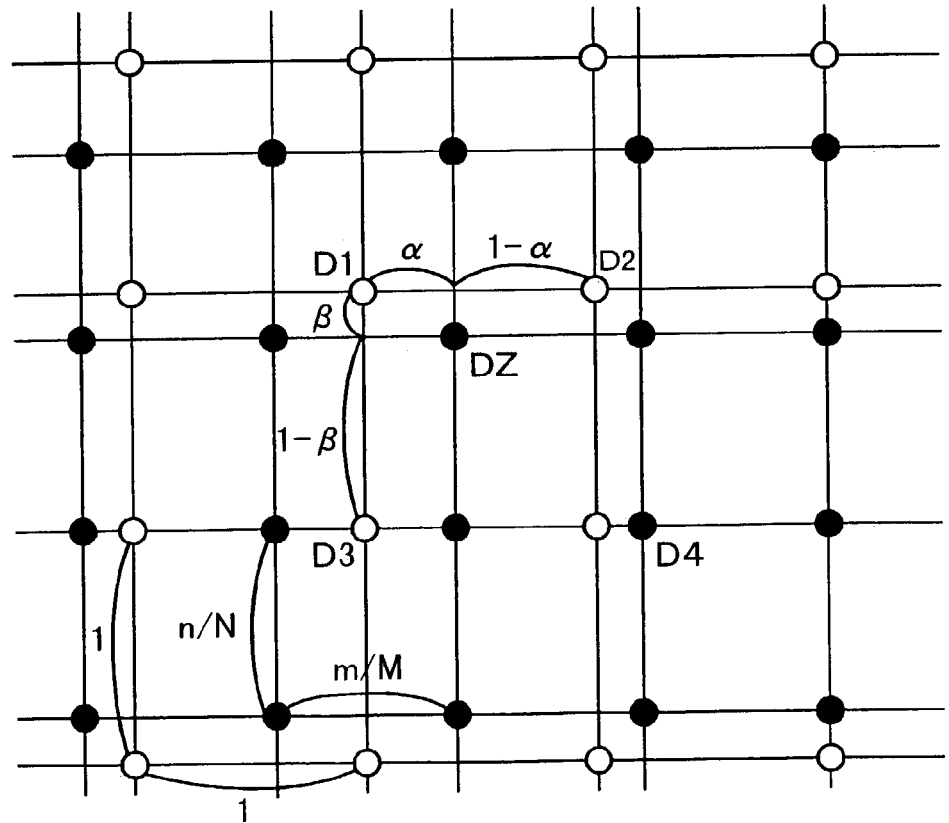

FIG. 43 is a schematic diagram representing pixel data of the image data Ri, Gi and Bi (○) and pixel data of the image data RZ, GZ and BZ (●). In FIG. 43, pixel data designated by "DZ" is one of the pixel data composing the image data RZ, GZ and BZ. As shown in FIG. 43, a distance of individual pixel data of the image data Ri, Gi and Bi is assumed to be 1. Accordingly, a horizontal distance and a vertical distance between adjacent pixels of the pixel data RZ, GZ and BZ are represented as m/M and n/N, respectively. A vertical distance and horizontal distance between the pixel data DZ and D1 are assumed to be $\beta$ and $\alpha$ ($0 \leq \alpha < 1$ and $0 \leq \beta < 1$). Accordingly, a vertical distance between pixel data DZ and D3 is represented as $1-\beta$, and horizontal distance between DZ and D2 is represented as $1-\beta$.

Figure 44A:
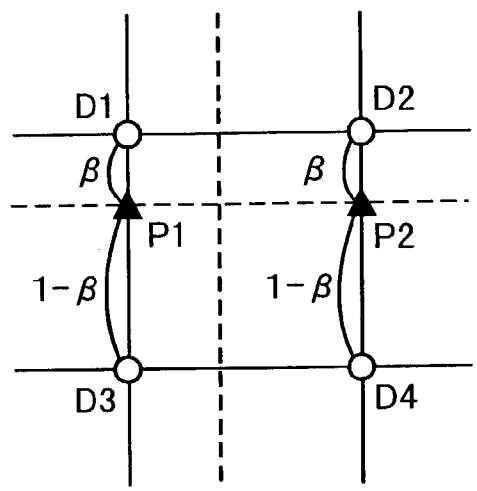

In FIG. 44(A), imaginary interpolation pixel data P1 and P2, which are located between the pixel data D1 and D3 and the pixel data D2 and D4, are calculated by following equations:

$$P1 = (1-\beta) \times D1 + \beta \times D3 \quad (3)$$

$$P2 = (1-\beta) \times D2 + \times D4 \quad (4)$$

Figure 44B:
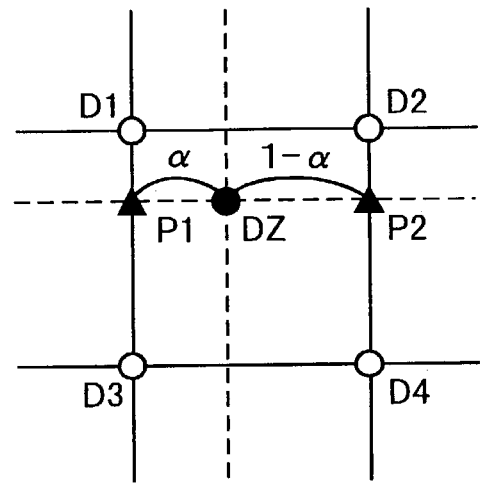

As shown in FIG. 44(B), the pixel data DZ are located between the imaginary pixel data P1 and P2, where $|P1-DZ|:|DZ-P2| = \alpha:1-\alpha$ ($|a-b|$ represents a distance between pixel data a and b). Therefore, the pixel data DZ is calculated by a following equation:

$$DZ = (1-\alpha) \times P1 + \alpha \times P2$$

$$= (1-\alpha) \times (1-\beta) \times D1 + \alpha \times (1-\beta) \times D2 + (1-\alpha) \times \beta \times D3 + \alpha \times \beta \times D4 \quad (5).$$

Figure 45A:
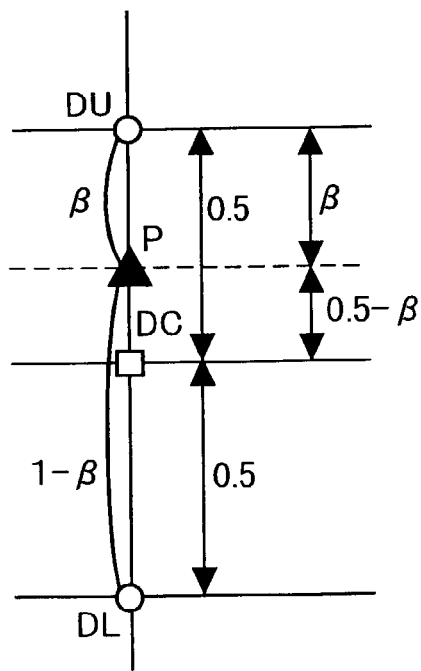

FIG. 45 is a diagram for explaining a process of calculating each of the imaginary interpolation pixel data P1 and P2 based on the upper line data DU, the center line data DC and the lower line data DL. In FIG. 45, each of the interpolation pixel data P1 and P2 is represented as the interpolation pixel data P. In FIG. 45(a), the interpolation pixel data P is located above the center line data DC, which means $0 \leq \beta < 0.5$. In this case, $|P-DU|:|DC-P| = \beta:(0.5-\beta) = 2\beta:(1-2\beta)$. Therefore, the pixel data P is calculated by a following equation:

$$P = (1-2\beta) \times DU + 2\beta \times DC \quad (6)$$

Figure 45B:
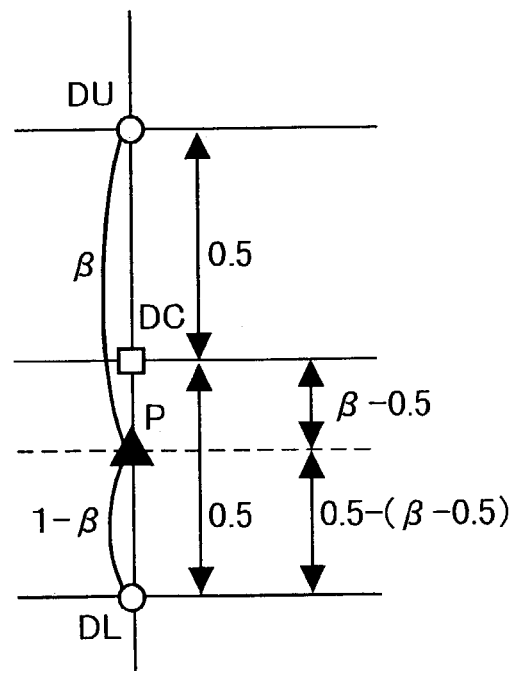

In FIG. 45(b), the interpolation pixel data P is located under the center line data DC, which means $0.5 < \beta \leq 1$. In this case, $|P-DC|:|DL-P| = \beta-0.5:1-\beta = 2\beta-1:2-2\beta$. Therefore, the interpolation pixel data P is calculated by a following equation:

$$P = (2-2\beta) \times DC + (2\beta-1) \times DL \quad (7)$$

Each of the pixel number conversion circuits 25a, 25b and 25c calculates the imaginary pixel data P1 and P2 based on the upper line data RU, GU and BU, the center line data RC, GC and BC, and the lower line data RL, GL and BL, using the equations (6) and (7). Then, calculates the pixel data DZ, i.e. the image data RZ, GZ and BZ, based on the imaginary interpolation pixel data P1 and P2 using the equation (5).

Since the image size conversion device according to the seventh embodiment converts the pixel number based on based on the upper line data RU, GU and BU, the center line data RC, GC and BC, and the lower line data RL, GL and BL, an image size can be increased without losing the high frequency components.

Eight Embodiment

Figure 46A:
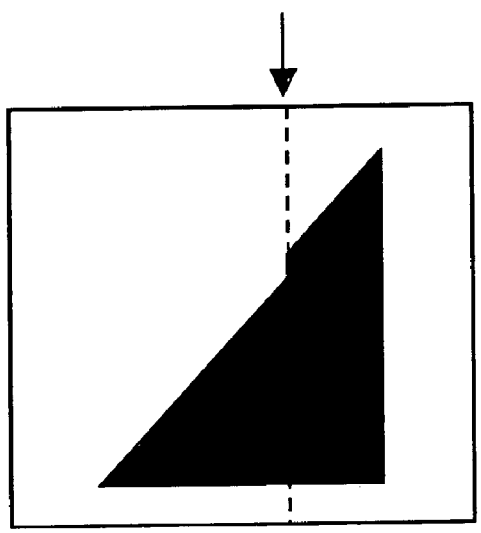
FIGS. 46 is a diagram for explaining an operation of the image interpolation device according to the eighth embodiment.
Figure 46B:
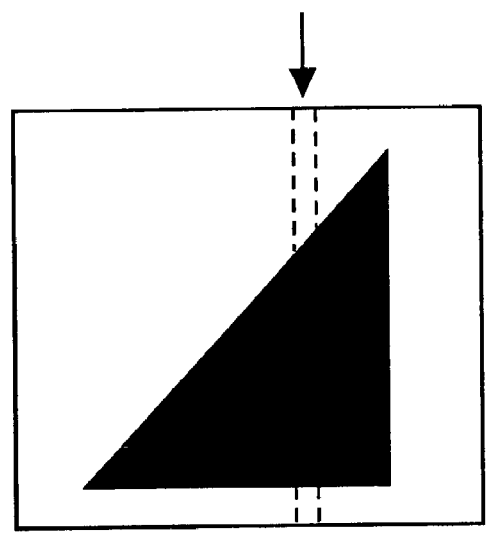
Figure 47:
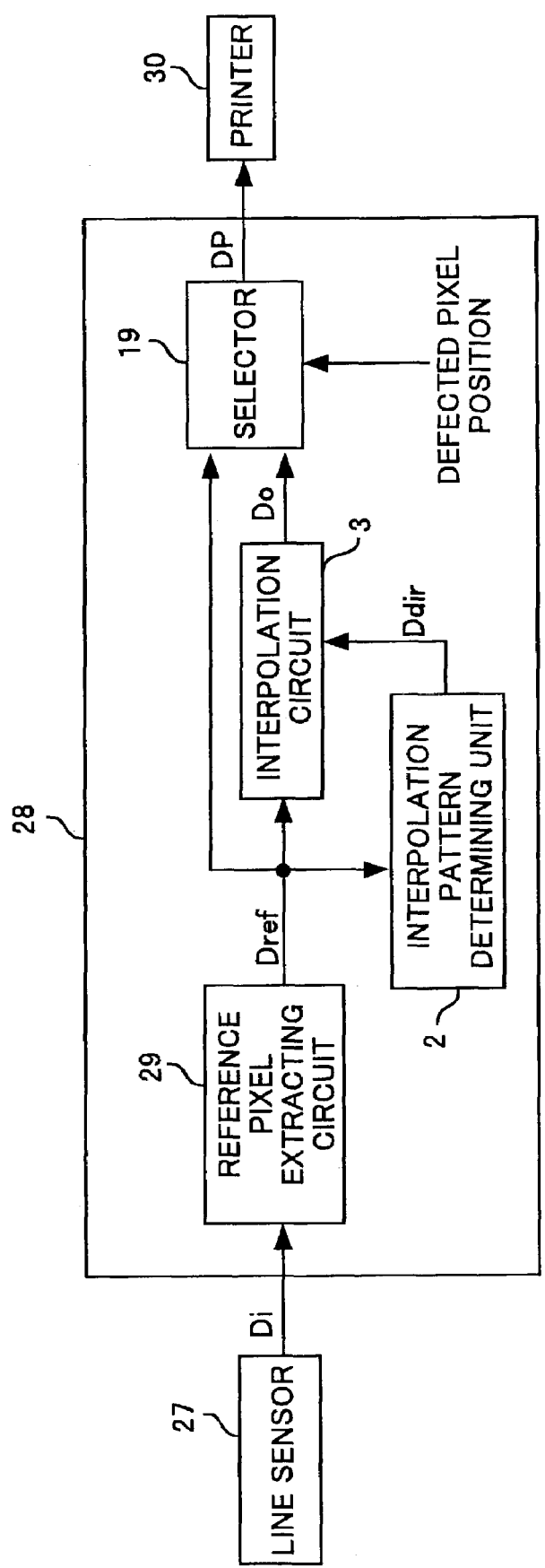
FIG. 47 is a block diagram showing a structure of an image interpolation device according to the eighth embodiment.

Eighth embodiment relates to an image interpolation device, which interpolates defected image. FIG. 47 is a diagram showing a structure of the image interpolation device according to the eighth embodiment. The image interpolation device according to the eighth embodiment includes a line sensor 27, and pixel interpolation device 28. The pixel interpolation device 28 includes the reference pixel extracting circuit 29, interpolation pattern determining unit 2, interpolation circuit 3 and selector 19. The line sensor 27 is composed of sensor array, which detects printed image. The line sensor 27 produce image data Di corresponding to the detected image. The image data Di is sent to the interpolation circuit 28. If the sensor elements of the line sensor 27 are partially defected, the image data becomes defected as shown in FIG. 46(A). The pixel interpolation device 28 interpolates the defected pixel data, thereby producing interpolated image shown in FIG. 46(B).

Figure 48:
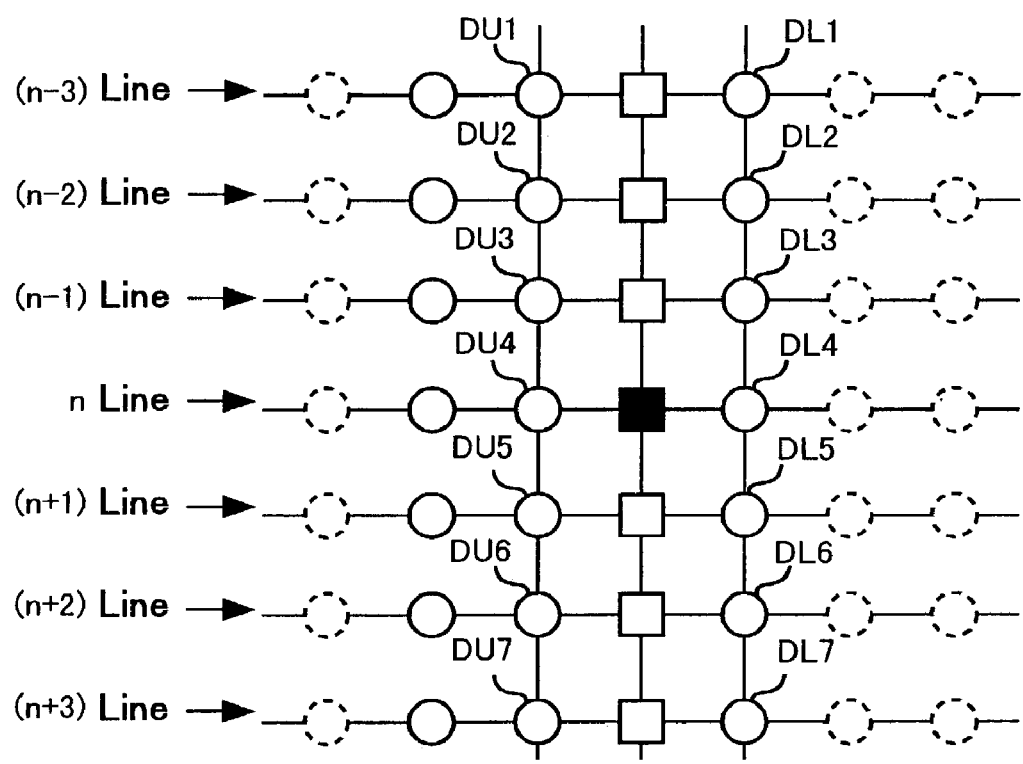
Figure 49:
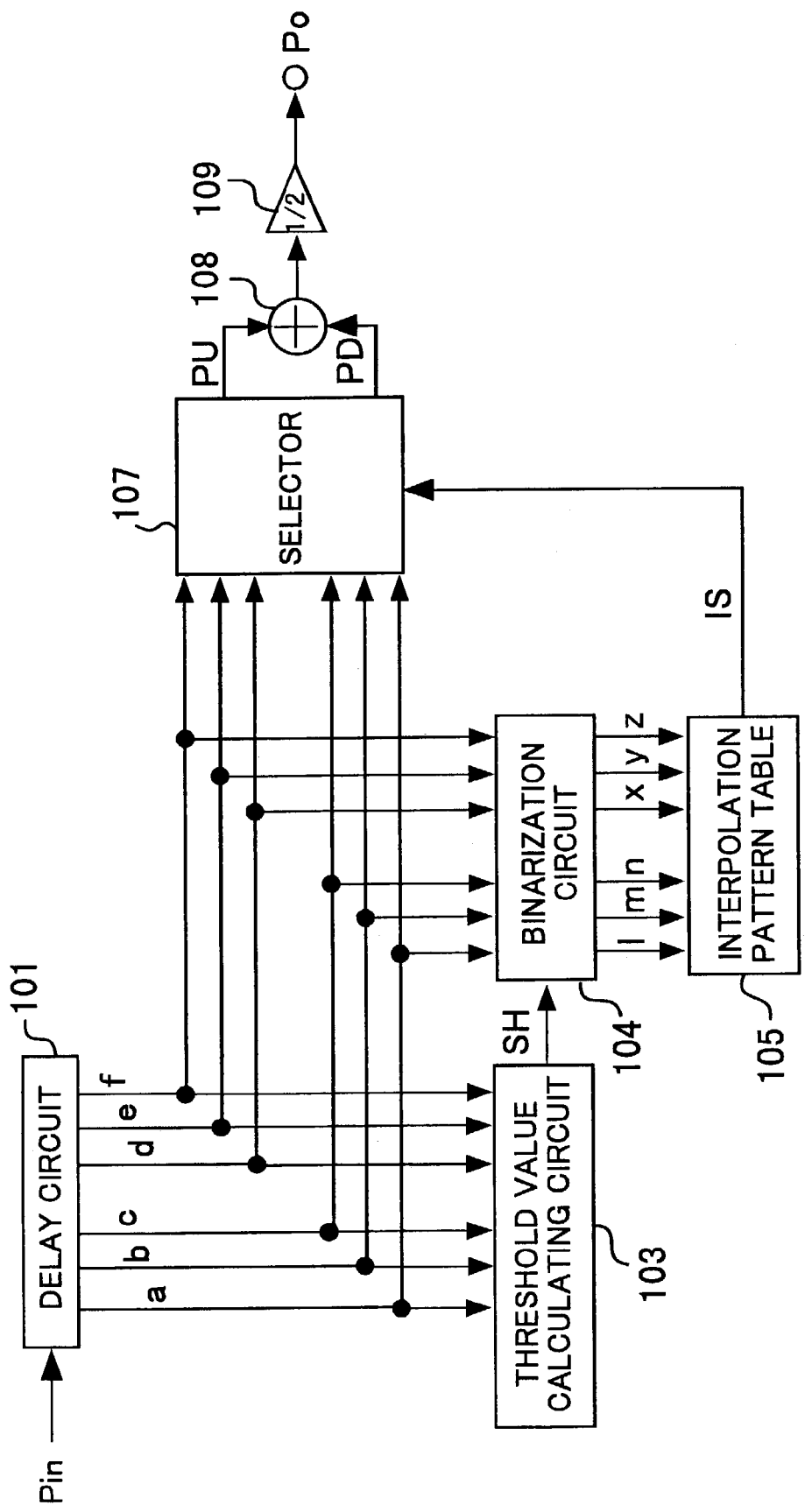
FIGS. 49 to 52 are diagrams for explaining the related art.
Figures 50, 51:
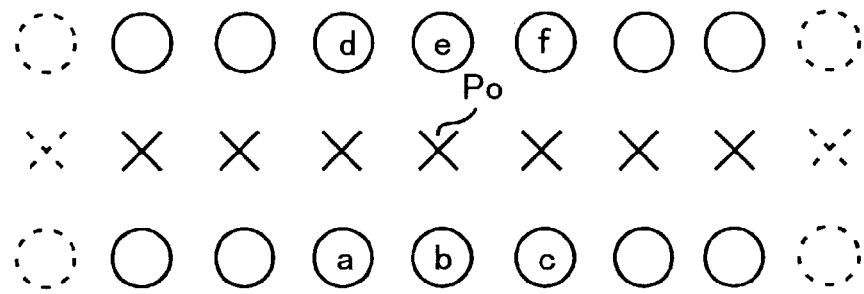
Figure 52:
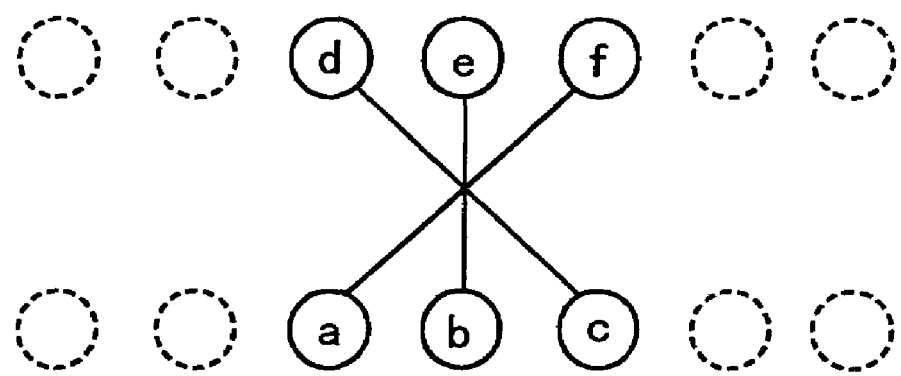

The reference pixel extracting circuit 29 extracts the pixel data located in both left and right sides of the defected portion and outputs them as reference pixel data Dref. FIG. 48 is a schematic diagram showing the reference pixel data Dref.

The reference pixel extracting circuit 29 extracts the pixel data DU1 to DU7 and DL1 to DL7 arranging vertically. The pixel data DU1 to DU7 and DL1 to DL7 are herein after referred to as the reference pixel data Dref.

The reference pixel data Dref are sent to the interpolation pattern determining unit 2, the interpolation circuit 3 and the selector 19. The interpolation pattern determining unit 2 outputs the interpolation direction data Ddir based on the reference pixel data Dref. The interpolation circuit 3 calculates the interpolation pixel data Do according to the interpolation direction data Ddir.

As shown in FIG. 47, the information indicating the location of the defected pixel is sent to the selector 19. The selector 19 outputs the reference pixel data Dref (the pixel data DU1 to DU7 and DL1 to DL7) and interpolation pixel data Do selectively, thereby producing the image data DP, which corresponds to the interpolated image data. The imaged data DP is sent to a printer 30. The interpolated image is printed by the printer 30.

The printer 30 may be replaced by an image display device or a data storage device for writing the image data DP in a recording medium.

According to the image interpolating device of the eighth embodiment, the defected image is interpolated precisely.

The invention claimed is:

1. A pixel interpolation device comprising:
   a reference pixel extracting circuit for extracting reference pixel data representing a plurality of pixels from an image data;
   a threshold value calculating circuit for calculating a threshold value based on the reference pixel data;
   a binarization circuit producing a binarized pixel data by binarizing the reference pixel data based on the threshold value;
   an interpolation pattern table outputting an interpolation direction data designating interpolation directions based on the binarized pixel data, the interpolation directions including directions joining the intermediate points of the pixels;
   a selector selecting pixel data representing the pixels located in the interpolation direction from the reference pixel data; and
   an interpolation circuit calculating an interpolation pixel data based on the pixel data selected by the selector.

2. A pixel interpolation device according to claim 1, wherein the selector selects pixel data representing the reference pixels located on each side of the intermediate points of the reference pixel data, when the interpolation direction data designates the interpolation direction joining the intermediate points.

3. A pixel interpolation device according to claim 1, wherein the threshold value calculating circuit calculates the threshold value by averaging the reference pixel data.

4. A pixel interpolation device according to claim 1, wherein the threshold value calculating circuit calculates the threshold value by averaging a maximum one and a minimum one of the reference pixel data.

5. A line interpolation device including the pixel interpolation device according to claim 1, the line interpolation device further including a selector which outputs a reference line consisting of the reference pixel data and an interpolation line consisting of the interpolation pixel data, alternately.

6. A line interpolation device according to claim 5, wherein the image data includes luminance data, and the reference pixel data is extracted from the luminance data.

7. A line interpolation device according to claim 5, wherein the image data includes a color difference data, and the reference pixel data representing pixels lying on each line at one dot interval is extracted from the color difference data.

8. An image size conversion device including the pixel interpolation device according to claim 1, the image size conversion device increasing an image size using the interpolation pixel data.

9. An image interpolation device including the pixel interpolation device according to claim 1, the image interpolation device further including:
   a detector for detecting defected pixel data from the image data; and
   a selector for replacing the defected pixel data with the interpolation pixel data.

10. An image display device including the interpolation device according to claim 1.

11. A pixel interpolation method comprising steps of:
    extracting reference pixel data representing a plurality of pixels from an image data;
    calculating a threshold value based on the reference pixel data;
    producing a binarized pixel data by binarizing the reference pixel data based on the threshold value;
    outputting an interpolation direction data designating interpolation directions based on the binarized pixel data, the interpolation directions including directions joining the intermediate points of the pixels;
    selecting pixel data representing the pixels located in the interpolation direction from the reference pixel data; and
    calculating an interpolation pixel data based on the selected pixel data.

12. A pixel interpolation method according to claim 11, wherein the interpolation pixel data is calculated based on the pixel data representing the reference pixels located on each side of the intermediate points of the reference pixel data, when the interpolation direction data designates the interpolation direction joining the intermediate points.

13. A pixel interpolation method according to claim 11, wherein the threshold value is calculated by averaging the reference pixel data.

14. A pixel interpolation method according to claim 11, wherein the threshold value is calculated by averaging a maximum one and a minimum one of the reference pixel data.

15. A line interpolation method including the steps of the pixel interpolation method according to claim 11, the line interpolation method further including a step of outputting a reference line consisting of the reference pixel data and an interpolation line consisting of the interpolation pixel data, alternately.

16. A line interpolation method according to claim 15, wherein the image data includes luminance data, and the reference pixel data is extracted from the luminance data.

17. A line interpolation method according to claim 15, wherein the image data is a color difference data, and the reference pixel data representing pixels lying on each line at one dot interval is extracted from the color difference data.

18. An image size conversion method including the steps of the pixel interpolation method according to claim 11, the image size conversion method increasing an image size using the interpolation pixel data.

19. An image interpolation method including the steps of the pixel interpolation method according to claim 11, the image interpolation method further including steps of:
    detecting defected pixel data from the image data; and
    replacing the defected pixel data with the interpolation pixel data.

* * * * *